(12) United States Patent
Rosseel et al.

(10) Patent No.: US 9,743,590 B2
(45) Date of Patent: Aug. 29, 2017

(54) AGRICULTURAL BALER

(71) Applicant: CNH Industrial America LLC, New Holland, PA (US)

(72) Inventors: Bram Rosseel, Snellegem (BE); Jeroen Devroe, Izegem (BE); Dries Liefooghe, Veurne (BE); Dieter Kindt, Vladslo (BE); Jonas Cappelle, Beveren (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/296,861

(22) Filed: Oct. 18, 2016

(65) Prior Publication Data

US 2017/0105352 A1 Apr. 20, 2017

(30) Foreign Application Priority Data

Oct. 20, 2015 (BE) .................................. 2015/5673

(51) Int. Cl.
*A01F 15/08* (2006.01)
*A01F 15/04* (2006.01)
(Continued)

(52) U.S. Cl.
CPC .......... *A01F 15/0841* (2013.01); *A01D 90/02* (2013.01); *A01F 15/10* (2013.01);
(Continued)

(58) Field of Classification Search
CPC .... A01F 15/101; A01F 15/10; A01F 15/0825; A01F 2015/102; A01F 2015/103;
(Continued)

(56) References Cited

U.S. PATENT DOCUMENTS 4,403,544 A   9/1983 Naaktgeboren
4,569,282 A * 2/1986 Galant .................... A01F 15/04
                                                        100/189

(Continued)

FOREIGN PATENT DOCUMENTS

CH    452975 A    3/1968
EP    0236578 A1  9/1987
GB    1130761 A   10/1968

OTHER PUBLICATIONS

EP16194830, Extended European Search Report, mailed Feb. 23, 2017, 6 pages.

*Primary Examiner* — Jimmy T Nguyen
(74) *Attorney, Agent, or Firm* — Peter K. Zacharias; Patrick M. Sheldrake

(57) ABSTRACT

A baler including a feeder duct and a feeder operable within the feeder duct. The feeder includes a tine bar holding member having rotatably mounted thereon at least one tine bar having mounted thereon a set of tines. The tine bar is rotatable about its own axis relative to the tine bar holding member and is rotatable together with the tine bar holding member about an offset axis. The feeder further includes a sun gear co-axial with and rotatable about the offset axis relative to the tine bar holding member; a mechanical coupling the tine bar to the sun gear; and an adjustment system configured for active adjustment of the angular position of the sun gear about the offset axis as the tine bar is rotated about the offset axis.

25 Claims, 16 Drawing Sheets

(51) Int. Cl.
*A01F 15/10* (2006.01)
*A01D 90/02* (2006.01)

(52) U.S. Cl.
CPC .......... *A01F 15/101* (2013.01); *A01F 15/042* (2013.01); *A01F 2015/102* (2013.01)

(58) Field of Classification Search
CPC .... A01F 15/0841; A01F 15/08; A01F 15/042; A01D 89/00; A01D 89/001; A01D 90/02
USPC ........................................ 100/7, 188 R, 189
See application file for complete search history.

(56) References Cited

U.S. PATENT DOCUMENTS

| | | | | |
|---|---|---|---|---|
| 4,751,810 | A | * | 6/1988 | Naaktgeboren ........ A01D 90/02 100/142 |
| 4,928,462 | A | * | 5/1990 | Lippens ................ A01F 15/101 100/142 |
| 5,768,872 | A | * | 6/1998 | Von Allworden ..... A01D 90/02 100/189 |
| 6,050,074 | A | * | 4/2000 | Clostermeyer ....... A01F 15/101 100/88 |
| 2014/0318391 | A1 | * | 10/2014 | Verhaeghe .......... A01F 15/0825 100/35 |

* cited by examiner

AGRICULTURAL BALER

CROSS REFERENCE TO RELATED APPLICATION

This application claims priority to Belgium Application No. 2015/5673 filed Oct. 20, 2015, the contents of which are incorporated herein by reference.

TECHNICAL FIELD

The present invention relates to agricultural balers, and more specifically to balers of the traditional rectangular type, i.e. balers which produce bales of crop material which are rectangular in side view.

PRIOR ART

In EP0236578 there is disclosed a baler of basically conventional design in that it comprises a bale chamber or chamber in which a bale of crop material is formed, having an inlet opening formed therein communicating with a feeder duct in which charges of crop material are accumulated which subsequently are transferred or stuffed in the bale chamber for compression by a reciprocable plunger operating within the bale chamber. Within the feeder duct feeder means are operable to accumulate a charge of crop material therein and then stuff that accumulated charge into the bale chamber. In this particular baler, the feeder means include two tine bars each rotatable about its own axis and about an offset axis. The tine bars are rotatable mounted on a tine bar holding member for rotation about their own axis. The tine bar holding member is rotatable about the offset axis. Both tine bars have mounted thereon two sets of tines. One of the tine bars has two sets of packer tines mounted thereon, the sets being angularly offset over 180°, while the other one of the tine bars has a set of packer tines and a set of longer stuffer tines mounted thereon, the sets being angularly offset over 180°. In operation the tine bars are rotated about the offset axis in a direction of rotation while the tine bars are rotated about their respective own axis in a direction of rotation opposite to the direction of rotation of the tine bars about the offset axis. To that effect, for each of the tine bars the feeder means are provided with a sun gear co-axial with and rotatable about the offset axis relative to the tine bar holding member, and with means drivingly coupling the tine bar to the sun gear. In the described baler, the sun gear is arranged to be held substantially stationary and the means drivingly coupling the tine bar to the sun gear are such that said tine bars are caused to rotate about their own axis relative to the tine bar holding member and the outer ends of the set of tines to follow a path of movement, in particular a generally apple shaped path of movement. In two revolutions of the tine bars about the offset axis, each set of tines is moved through the feeder duct one time: first each set of packer tines is moved through the feeder duct one after the other to accumulate crop material in the feeder duct and subsequently the set of longer stuffer tines is moved through the feeder duct to stuff the accumulated crop material through the inlet opening into the bale chamber. The cyclic movement of the feeder means and the cyclic movement of the plunger are such that the plunger is near its bottom dead center when the stuffer tines stuff the accumulated crop material into the bale chamber.

The general arrangement of the feeder means as provided in the baler disclosed in EP0236578, i.e. comprising a tine bar holding member having rotatable mounted thereon a tine bar having mounted thereon a set of tines; said tine bar being rotatable about its own axis relative to the tine bar holding member and being rotatable together with the tine holding member about an offset axis; and a sun gear co-axial with and rotatable about the offset axis relative to the tine bar holding member; and means drivingly coupling the tine bar to the sun gear, such that as said tine bar is rotated about the offset axis and the sun gear co-axially therewith is held stationary, the means drivingly coupling the tine bar to the sun gear causes said tine bar to rotate about its own axis relative to the tine bar holding member, and the outer ends of the set of tines to follow a path of movement, have been found to be robust and reliable despite being exposed to the inside of the feeder duct.

SUMMARY OF THE INVENTION

The object of the present invention to provide an improved baler including such general arrangement of the feeder means.

Thereto, the feeder means of a baler according to the invention further comprise an adjustment system configured for active adjustment of the angular position of the sun gear about the offset axis as said tine bar is rotated about the offset axis.

Adjustment of the angular position of the sun gear relative to the offset axis as said tine bar is rotated about the offset axis allows for adjustment of the path of movement of the outer ends of the set of tines. Actively adjusting the angular position of the sun gear relative to the offset axis as said tine bar is rotated about the offset axis, in particular on the basis of at least one operational parameter of the baler, allows during operation of the baler for adjusting the path of movement of the ends of the tines to certain phases of the operation of the baler or to different conditions of operation of the baler. The latter allows for particular improvements to the path of movement of the outer ends of the tines relative to the known feeder means as introduced herein above wherein the sun gear is held substantially stationary.

A drawback of the path of movement of the end of the tines in the baler disclosed in EP0236578 that may be addressed by active adjustment of the angular position of the sun gear relative to the offset axis as said tine bar is rotated about the offset axis is that in the disclosed baler the path of movement of the ends of the longer stuffer tines pass through the plunger. In particular, in this prior art baler the ends of the stuffer tines pass through slots provided in the plunger. These slots are provided in the plunger to allow needles of the knotter mechanism to pass through the plunger once the forming of a bale in the bale chamber is finished and the bale is wire boundbale chamber. As a result of the ends of the stuffer tines passing through the slots, crop material conveyed by the stuffer tines ends up in the slots. This crop material may be engaged by the needles passing through the slots and thus may end up in the knotter mechanism. Once in the knotter mechanism, this crop material prevents proper operation of the knotter mechanism. By active adjustment, according to an advantageous embodiment of the invention, of the angular position of the sun gear relative to the offset axis as said tine bar is rotated about the offset axis on the basis of at least one operation parameter of the baler, wherein the least one operation parameter of the baler includes the angular position of the tine bar relative to the offset axis, this drawback may be addressed. The latter is in particular effectuated by adjusting the angular position of the sun gear relative to the offset axis, and thereby adjusting the path of movement of the ends of the longer stuffer tines to the effect that the path of movement of the outer ends of the longer stuffer tines runs underneath the bottom wall of the bale chamber. While the tine bar having the longer stuffer tines mounted thereon is rotated about the offset axis, the angular position of the sun gear may be adjusted over the range of angular positions of the tine bar where the outer ends of stuffer tines would pass through the bottom wall of the bale chamber and the plunger bale chamber. After the outer ends of stuffer tines have passed the bottom wall of the bale chamber, the angular position of the sun gear relative to the offset axis can be returned to its initial position, such that the remainder of the path of movement of the outer ends of the stuffer tines is not effected by the temporary adjustment.

Active adjustment of the angular position of the sun gear relative to the offset axis as the tine bar is rotated about the offset axis based on the angular position of the tine bar relative to the offset axis even allows for continuous adjustment of the angular position of the sun gear relative to the offset axis over the whole range of angular positions of the tine bar relative to the offset axis during one revolution of the tine bar about the offset axis, thereby achieving a fully adjusted path of movement of the outer ends of tines relative to the path of movement that would be followed by the outer ends of the tines if the sun gear would be held stationary.

The continuous adjustment of the angular position of the sun gear is advantageously effected by continuously increasing and decreasing the angular speed of the sun gear relative to the angular speed of the tine bar about the offset axis, optionally in combination with change of direction of rotation of the sun gear. In an advantageous embodiment of the baler according to the invention the continuous adjustment of the angular position of the sun gear relative to the offset axis based on the angular position of the tine bar relative to the offset axis is achieved with an adjustment system comprising a mechanical linkage coupling angular positions of the sun gear relative to the offset axis to an angular positions of the tine bar relative to the offset axis, and configured for transforming angular motion of the tine bar about the offset axis into angular motion of the sun gear about the offset axis. A mechanical linkage allows for mechanically transforming angular movement of the tine bar relative to the offset axis into angular movement of the sun gear. In particular, a mechanical linkage allows for several transformations, including translation in one direction into translation in opposite direction, and rotation into translation and vice versa, wherein the transformation rotation into translation and vice versa allows for achieving acceleration and deceleration of movements. By using a mechanical linkage coupling angular positions of the sun gear relative to the offset axis to angular positions of the tine bar relative to the offset axis, the transformation capabilities of a mechanical linkage can advantageously be used in the present invention to achieve continuous adjustment of the angular position of the sun gear relative to the offset axis based on the angular position of the tine bar relative to the offset axis.

In a preferred embodiment of the baler according to the invention including such mechanical linkage, the means drivingly coupling the tine bar to the sun gear are adapted to cause said tine bar to rotate about its own axis relative to the tine holding member in a direction opposite to the direction of rotation of the tine bar about the offset axis as said tine bar is rotated about the offset axis and the sun gear is held stationary, wherein the absolute angular speed of the tine bar about its own axis is the same as the absolute angular speed of the tine bar about the offset axis; and the mechanical linkage is adapted for transforming a rotational motion of the tine bar about the offset axis into an oscillating motion of the sun gear about the offset axis.

In this preferred embodiment the feature that the means drivingly coupling the tine bar to the sun gear are adapted to causes said tine bar to rotate about its own axis relative to the tine holding member in a direction opposite to the direction of rotation of the tine bar about the offset axis as said tine bar is rotated about the offset axis and the sun gear is held stationary, wherein the absolute angular speed of the tine bar about its own axis is the same as the absolute angular speed of the tine bar about the offset axis, results in the angular position of the set of tines relative to a vertical line through the own axis of the tine bar to remain unchanged as the tine bar is rotated about the offset axis in case the sun gear is held stationary. With the outer ends of the set of tines pointing in a downward direction when the set of tines pass through the feeder duct to allow the outer ends to enter the feeder duct, this first feature of this preferred embodiment thus allows for the outer ends of the set of tines pointing in a downward direction during a full revolution of the tine bar about the offset axis in case the sun gear is held stationary. This results in a circular path of movement of the outer ends of the tines as the tine bar is rotated about the offset axis, that runs underneath the bottom wall of the bale chamber, such that no slots have to be provided in the bottom wall of the bale chamber and in the plunger to allow the tines to pass there through, and requiring only a single set of tines to be mounted on the tine bar to achieve that a set of tines of the tine bar passes through the feeder duct each revolution of the tine bar about the offset axis. By combining this feature with the second feature of this preferred embodiment of the mechanical linkage being adapted for transforming a rotational motion of the tine bar about the offset axis into an oscillating motion of the sun gear about the offset axis, the circular path of movement of the outer ends of the tines, that would have a limited length in the feeder duct, is adjustable into an oval shape, allowing for a longer length of the path of movement of the outer ends of the tines in the feeder duct. Relative to the apple shaped path provided by the feeder means of the baler disclosed in EP0236578, the oval shaped path of movement of the outer ends of the tines allow for the tines to reach further into the lower end of the feeder duct, which is in particular advantageous when the tines function as packer tines conveying crop material from the lower end of the feeder duct further into the feeder duct. The feeder means according to this preferred embodiment thus allows for providing an improved alternative for the tine bar of the feeder means of the baler disclosed in EP0236578 having two sets of packer tines mounted thereon, that in addition only requires a single set of tines to be mounted on the tine bar.

In a further advantageous embodiment of the baler according to the invention provided with a mechanical linkage coupling angular positions of the sun gear relative to the offset axis to an angular positions of the tine bar relative to the offset axis, and configured for transforming angular motion of the tine bar about the offset axis into angular motion of the sun gear about the offset axis, the mechanical linkage is provided with an arrangement for additionally adjusting the angular position of the sun gear relative to the offset axis. This allows a mechanical linkage that without the arrangement would provide the same path of movement of the outer ends of the tines for each revolution of the tine bar about the offset axis, to be adjustable in the sense that the path of movement of the outer ends of the tines may be adjusted, allowing for further adjustment of the path of movement of the outer end of the tines.

In an advantageous embodiment thereof, the arrangement for additionally adjusting the angular position of the sun gear relative to the offset axis is adapted for active additional adjustment as the tine bar is rotated about the offset axis. This allows during operation of the baler for additional adjustment of the path of movement of the ends of the tines to certain phases of the operation of the baler or to different conditions of operation of the baler, in particular in case the active additional adjustment is based on at least one operational parameter of the baler. This for instance allows for a mechanical linkage that during a first revolution of the tine bar about the offset axis imposes a first path of movement of the outer ends of the tines, to impose a second different path of movement of the outer ends of the tines during a subsequent second revolution of the tine bar about the offset axis.

In the preferred embodiment of the baler according to the invention described herein above wherein the mechanical linkage is adapted for transforming a rotational motion of the tine bar about the offset axis into an oscillating motion of the sun gear about the offset axis, such arrangement for active additional adjustment of the angular position of the sun gear relative to the offset axis is advantageously included in the mechanical linkage as an arrangement adapted for amplifying the oscillating motion of the sun gear based on the position of the plunger in the bale chamber. In said preferred embodiment amplification of the oscillating motion of the sun gear imposed by the mechanical linkage results in an oval shaped path of movement that is longer along the major axis thereof. Not amplifying the oscillating motion of the sun gear during a first revolution of the tine bar about the offset axis and amplifying the oscillating motion of the sun gear during a subsequent second revolution of the tine bar about the offset axis, results in two different oval shaped paths of movement of the outer ends of the tines. As described herein above with respect to the preferred embodiment, the oval shaped path of movement of the outer ends of the tines during the first revolution allow for the set of tines to effectively function as packer tines.

During the second revolution, the oval shaped path of movement that is longer along the major axis thereof as a result of the amplification of the angular motion of the sun gear reaches further in the direction of the upper end of the feeder case than the oval shaped path of movement during the first revolution, allowing the set of tines during the second revolution to function as stuffer tines. By basing the amplification on the position of the plunger in the bale chamber, can be achieved that the oscillating motion is amplified and thus the set of tines is caused to function as stuffer tines when the plunger is in or near its bottom dead center. Providing the mechanical linkage of the above described preferred embodiment of the baler according to the invention with an arrangement adapted for amplifying the oscillating motion of the sun gear based on the position of the plunger in the bale chamber, thus allows for providing an alternative for the tine bar of the feeder means of the baler disclosed in EP0236578 having a set of packer tines as well as a set of stuffer tines.

In an advantageous embodiment of the baler according to the invention with a mechanical linkage provided with an arrangement adapted for amplifying the oscillating motion of the sun gear based on the position of the plunger in the bale chamber, the mechanical linkage comprises a plurality of links mutually coupled at joints, wherein said plurality of links comprises a pivotable link having a first joint and a second joint, said pivotable link being pivotable about a pivot axis offset from the joints thereby providing transformation of a motion of the first joint in a motion of the second joint, wherein the mechanical linkage is configured for transforming a rotational motion of the tine bar about the offset axis into an oscillating motion of the first joint, for transforming the oscillating motion of the first joint into an oscillating motion of the second joint by means of the pivotable link, and for transforming the oscillating motion of the second joint into an oscillating motion of the sun gear, and wherein the arrangement adapted for amplifying the oscillating motion of the sun gear is configured for moving the pivot axis in the direction opposite to the direction of motion of the first joint along a path for amplification of the angular displacement of the sun gear. In a preferred embodiment thereof, the baler comprises a crank mechanism for driving the plunger, said crank mechanism comprising a crank rotatable about a crank axis and a mechanical linkage for transforming a rotating motion of the crank in the reciprocating motion of the plunger in the bale chamber, wherein the arrangement adapted for amplifying the oscillating motion of the sun gear comprises a mechanical linkage adapted for transforming a rotational motion of the crank into an oscillating motion of the pivot point.

In stead of or in addition to an arrangement adapted for amplifying the oscillating motion of the sun gear based on the position of the plunger in the bale chamber as described herein above, the arrangement for additionally adjusting the angular position of the sun gear relative to the offset axis advantageously comprises at least one link arranged such that a change of length thereof changes the angular position of the sun gear, wherein said link is provided with length adjustment means for adjusting the length of the link. This allows for adjusting the path of movement of the outer ends of the tines by adjusting the length of the link. The length adjustment means can be configured for fixed adjustment, i.e. adjustment of length of the link while the baler is not in operation, wherein the adjustment remains fixed during operation. Alternatively or additionally, the length adjustment means can be configured for passive adjustment, i.e. adjustment during operation of the baler under the influence of certain operational conditions. In a advantageous embodiment of the baler according to the invention being provided with such passive length adjustment means, the length adjustment means comprise resilient means urging said link into a first length and permitting changing said length in response to the load on said link. This allows for change of length of the link provided with the length adjustment means when the load on said link exceeds a certain value. Such passive length adjustment in response to the load on a link arranged such that a change of length thereof changes the angular position of the sun gear, can be used as an over load protection wherein in case the load on the tines as the outer ends thereof pass through the feeder duct exceeds a certain value, the load on the link provided with the length adjustment means exceed a certain value causing the length of said link to change such that the angular position of the sun gear changes and therewith the outer ends of the tines are angularly moved about the own axis of the tine bar in the direction wherein the load works, thereby preventing further rise of the load. Alternatively or additionally to the fixed and/or passive length adjustment, the length adjustment means can be configured for active adjustment of the length of said link. Such length adjustment means advantageously comprise an actuator, preferably a linear actuator, sensor means for sensing at least one operational parameter of the baler, and a controller connected to the actuator for controlling the actuator and connected to the sensor means for receiving said operational parameter, wherein the controller is adapted for controlling the actuator on the basis of the operational parameter received from the sensor means. Such an active length adjustment means allows for adjusting the length of said link, thereby adjusting the angular position of the sun gear and thus the path of movement of the outer ends of the tines in addition to the active adjustment of the angular position of the sun gear and thus the path of movement of the outer ends of the tines provided by the mechanical linkage. This active length adjustment means can advantageously be configured for sensing the load on the set of tines, and adjusting the length of the link such that the tines are angularly moved in the direction in which the load works in case the load exceeds a certain value, thereby preventing further rise of the load. Alternatively or additionally, the active length adjustment means for actively adjusting the length of a link of the mechanical linkage wherein the link is arranged such that a change of length thereof changes the angular position of the sun gear, can advantageously even be used to provide the above described arrangement for amplifying the angular motion of the sun gear based on at least one additional operational parameter of the baler, wherein the controller is configured to increase or decrease the length of the link based on at least one operational parameter of the baler sensed by the sensor, in order to amplify or attenuate the angular motion of the sun gear imposed by the mechanical linkage coupling angular positions of the sun gear to angular positions of the tine bar relative to the offset axis. A linear actuator could for instance be arranged for moving the pivot axis of the pivotable link in the above described embodiment of an arrangement for amplification of the angular motion of the sun gear, sensor means be configured for sensing the angular position of the tine bar and for sensing the position of the plunger in the bale chamber, and a controller be configured to move the pivot axis on the basis of the angular position of the tine bar and the position of the plunger in the bale chamber.

An arrangement comprising an actuator, sensor means for sensing at least one operational parameter of the baler, and a controller connected to the actuator for controlling the actuator and connected to the sensor means for receiving said operational parameter, wherein the controller is adapted for controlling the actuator on the basis of the operational parameter received from the sensor means, can be used in addition to or even an alternative for each of the mechanical linkages of the embodiments described herein above. Such an arrangement can even be used to replace all mechanical linkages by arranging the actuator for direct angular displacement of the sun gear, in particular engaging the sun gear or coupled to the sun gear by means of a transmission. In the embodiment where the means drivingly coupling the tine bar to the sun gear are adapted to causes said tine bar to rotate about its own axis in a direction opposite to the direction of rotation of the tine bar about the offset axis as said tine bar is rotated about the offset axis and the sun gear is held stationary, and wherein a mechanical linkage is provided for transforming a rotational motion of the tine bar about the offset axis into an oscillating motion of the sun gear about the offset axis, a linear actuator or rotary actuator could provide the oscillating motion of the sun gear in stead of the mechanical linkage, wherein the sensor means are configured for sensing the angular position of the tine bar, and the controller is configured to oscillate the sun gear on the basis of the angular position of the tine bar. In case a rotary actuator is arranged for direct angular displacement of the sun gear, the means drivingly coupling the tine bar to the sun gear may alternatively be adapted to causes said tine bar to rotate about its own axis in the same direction as the direction of rotation of the tine bar about the offset axis as said tine bar is rotated about the offset axis and the sun gear is held stationary. In that case alternately increasing and decreasing the rotational speed of the sun gear while rotating the sun gear in one direction provides the equivalent effect of oscillating the sun gear in the embodiment wherein the means drivingly coupling the tine bar to the sun gear are adapted to causes said tine bar to rotate about its own axis in a direction opposite to the direction of rotation of the tine bar about the offset axis as said tine bar is rotated about the offset axis and the sun gear is held stationary.

Although a linear or rotary actuator thus may replace each of the mechanical linkages of above described embodiments, mechanical linkages have the advantage of being more reliable in operation, in particular with respect to synchronization of movements. Furthermore, mechanical linkages allow for faster response and faster reversal of direction of movement. On the other hand, actuators allow for more variation in the angular movement imposed on the sun gear. In view thereof, a combination of actuators and mechanical linkages, in particular the combinations described in embodiments herein above, allows both for reliability in operation, in particular with respect to synchronization of movements, and fast response and reversal of direction of movement, provided by the mechanical linkage, as well as for variation in the angular movement imposed on the sun gear.

In an advantageous embodiment of the baler according to the invention:

the tine bar holding member has multiple tine bars rotatable mounted thereon, each tine bar having mounted thereon a set of tines; and each tine bar being rotatable about its own axis relative to the tine bar holding member and being rotatable together with the tine bar holding member about the offset axis;

at least two of the tine bars are drivingly coupled to a respective sun gear co-axial with and rotatable about the offset axis, such that as each of said two tine bars is rotated about the offset axis and the respective sun gear drivingly connected thereto is held stationary, the respective means drivingly coupling the tine bar to the sun gear cause said tine bar to rotate about its own axis and the outer ends of the set of tines to follow a path of movement;

wherein for each of the sun gears a respective path of movement adjustment system is provided configured for active adjustment of the path of movement of the outer ends of the set of tines mounted on a tine bar drivingly coupled to the sun gear by angular motion of the sun gear about the offset axis as said tine bar is rotated about the offset axis.

In case a plurality of tine bars is mounted on the tine bar holding member, this embodiment allows the path of movement of at least two of the plurality of tine bars to be individually adjusted.

In an advantageous alternative embodiment of the baler according to the invention:

the tine bar holding member has multiple tine bars rotatable mounted thereon, each tine bar having mounted thereon a set of tines; and each tine bar being rotatable about its own axis relative to the tine bar holding member and being rotatable together with the tine bar holding member about the offset axis;

wherein at least two of the tine bars are drivingly coupled to the same sun gear, such that as said at least two tine bars are rotated about the offset axis and the sun gear co-axially therewith is held stationary, the means drivingly coupling the tine bars to the sun gear causes each of the at least two tine bars to rotate about its own axis relative to the tine bar holding member, and the outer ends of the set of tines mounted thereon to follow a path of movement.

In case a plurality of tine bars is mounted on the tine bar holding member, this embodiment allows the path of movement of at least two of the plurality of tine bars to be correspondingly adjusted. In case the plurality of tine bars include at least three tine bars, this embodiment can be combined with the previous embodiment. Combination of these embodiment for instance allows for two tine bars to be drivingly coupled to a first sun gear, such that the paths of movement of these two tine bars can be adjusted simultaneously, while a third tine bar is drivingly coupled to a second sun gear such that the path of movement of the third tine bar can be adjusted separately from the other two tine bars.

The present invention further relates to a method for operating an agricultural baler according to the invention as described herein above. In particular a method for operating an agricultural baler comprising a bale chamber having an inlet opening formed therein; a feeder duct communicating with the bale chamber through the inlet opening for charges of crop material to be transferred from the feeder duct into the bale chamber; a plunger reciprocable within the bale chamber to compress successive charges of crop material received from the feeder duct to form a bale; and feeder means operable within the feeder duct to accumulate a charge of crop material therein and then stuff that accumulator charge into the bale chamber; the feeder means comprising: a tine bar holding member having rotatable mounted thereon a tine bar having mounted thereon a set of tines; said tine bar being rotatable about its own axis relative to the tine bar holding member and being rotatable together with the tine holding member about an offset axis; a sun gear co-axial with and rotatable about the offset axis relative to the tine bar holding member; and means drivingly coupling the tine bar to the sun gear, such that as said tine bar is rotated about the offset axis and the sun gear co-axially therewith is held stationary, the means drivingly coupling the tine bar to the sun gear causes said tine bar to rotate about its own axis relative to the tine bar holding member, and the outer ends of the set of tines to follow a path of movement.

The method according to the invention comprises rotating said tine bar about the offset axis and actively adjusting the angular position of the sun gear relative to the offset axis as said tine bar is rotated about the offset axis.

As described herein above with respect to the baler according to the invention, actively adjusting the angular position of the sun gear relative to the offset axis as said tine bar is rotated about the offset axis, in particular on the basis of at least one operation parameter of the baler, allows for adjusting the path of movement of the ends of the tines to certain phases of the operation of the baler or to different conditions of operation of the baler. The latter allows for particular improvements to the path of movement of the outer ends of the tines relative to the known feeder means as introduced herein above wherein the sun gear is held substantially stationary. In an advantageous embodiment of the method according to the invention the at least one operation parameter of the baler on which the adjustment of the angular position of the sun gear relative to the offset axis as said tine bar is rotated about the offset axis is based, includes the angular position of the tine bar relative to the offset axis.

In an advantageous embodiment of the method according to the invention:
the bale chamber has a bottom wall in which the inlet opening is formed, wherein the feeder duct has an upper end facing generally upwardly and communicating with the inlet opening in the bale chamber and a lower end facing generally in a forward direction;
the feeder duct is generally circularly curved in shape with the center of curvature being either co-incident with the offset axis or proximate thereto, and, during operation, the set of tines of the tine bar move through the feeder duct in the direction from the lower end toward the upper end thereof; and
in the part of the angular motion of the tine bar between the upper end and the lower end of the feeder duct the sun gear is angularly moved such that the tine bar is angularly moved about is own axis relative to the tine bar holding member in a direction opposite to the direction of rotation of the tine bar about the offset axis, and in the part of the angular motion of the tine bar between the lower end and the upper end of the feeder duct the sun gear is angularly moved such that the tine bar is not angularly moved about its own axis relative to the tine bar holding member or is angularly moved about its own axis relative to the tine bar holding member with an angular displacement that is small relative to the angular displacement of the tine bar about its own axis relative to the tine bar holding member in the part of the angular motion of the tine bar between the upper end and the lower end of the feeder duct.

In an advantageous embodiment of the method according to the invention:
the means drivingly coupling the tine bar to the sun gear are adapted to causes said tine bar to rotate about its own axis relative to the tine bar holding member in a direction opposite to the direction of rotation of the tine bar about the offset axis as said tine bar is rotated about the offset axis and the sun gear is held stationary;
the bale chamber has a bottom wall in which the inlet opening is formed, wherein the feeder duct has an upper end facing generally upwardly and communicating with the inlet opening in the bale chamber and a lower end facing generally in a forward direction; and
the feeder duct is generally circularly curved in shape with the center of curvature being either co-incident with the offset axis or proximate thereto, and, during operation, the set of tines of the tine bar move through the feeder duct in the direction from the lower end toward the upper end thereof;
wherein
over at least part of the angular motion of the tine bar relative to the offset axis between the lower end and the upper end of the feeder duct the sun gear is angularly displaced in the same direction as the direction of rotation of the tine bar about the offset axis and over at least part of the angular motion of the tine bar between the upper end and the lower end of the feeder duct the sun gear is rotated in the direction opposite to the direction of rotation of the tine bar about the offset axis.

In a further advantageous embodiment of the method according to the invention the at least one operation parameter of the baler on which the adjustment of the path of movement of the outer ends of the set of tines is based, includes the position of the plunger in the bale chamber.

In an advantageous embodiment thereof for each full cycle of the reciprocating motion of the plunger the tine bar is rotated about the offset axis in a plurality of full cycles, and during one of said cycles of the rotational movement of the tine bar about the offset axis the sun gear is angularly moved such that the angular movement of the tine bar about its own axis relative to the tine bar holding member is amplified relative to the angular movement of the tine bar about its own axis relative to the tine bar holding member during the other cycles of the rotational movement of the tine bar about the offset axis.

The mechanical linkages and actuator/controller/sensor means arrangements of the embodiments of the baler according to the invention described herein above are advantageously configured to execute at least one of the above embodiments of the method according to the invention.

BRIEF DESCRIPTION OF THE FIGURES

The accompanying drawings are used to illustrate present non-limitative preferred exemplary embodiments of the present invention. The above stated and other advantages, features and objectives of the invention will become more apparent, and the invention better understood, from the following detailed description when read in combination with the accompanying drawings, in which.

DETAILED DESCRIPTION OF THE FIGURES

Figure 1:
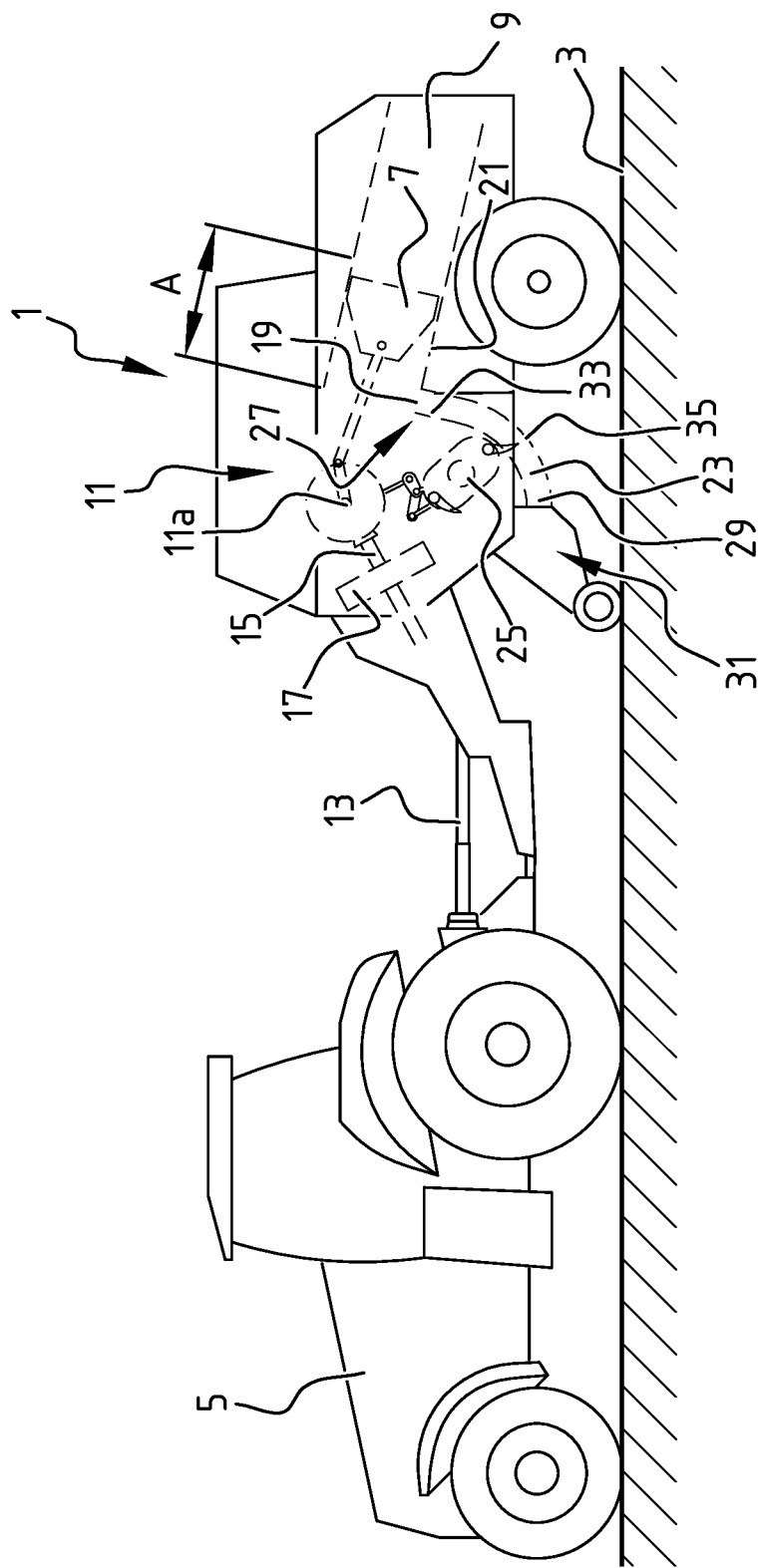
FIG. 1 shows a schematic side view of an embodiment of a baler according to the invention, pulled and driven by a tractor.

FIG. 1 shows a rectangular agricultural baler 1. Baler 1 can be moved forward over ground surface 3 by means of a tractor 5. Baler 1 is provided with a plunger 7 that during operation is moved reciprocally along a linear path A in bale chamber 9 by means of a crank mechanism 11 connected to plunger 7. Crank mechanism 11 is connected for driving via a drive shaft 13 to the motor of tractor 5. Tractor 5 is provided for this purpose with a power take-off device, also referred to as PTO. Drive shaft 13 connects an output shaft of the PTO of tractor 5 to an input shaft 15 of crank mechanism 11. A flywheel 17 is arranged on the input shaft of the crank mechanism.

The bale chamber 9 has an inlet opening 19 formed in the bottom wall 21 thereof. A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 has an upper end 27 facing generally upwardly and communicating with the inlet opening 19 in the bale chamber 9 and a lower end 29 facing generally in a forward direction and communicating with a pickup unit 31.

Figure 2:
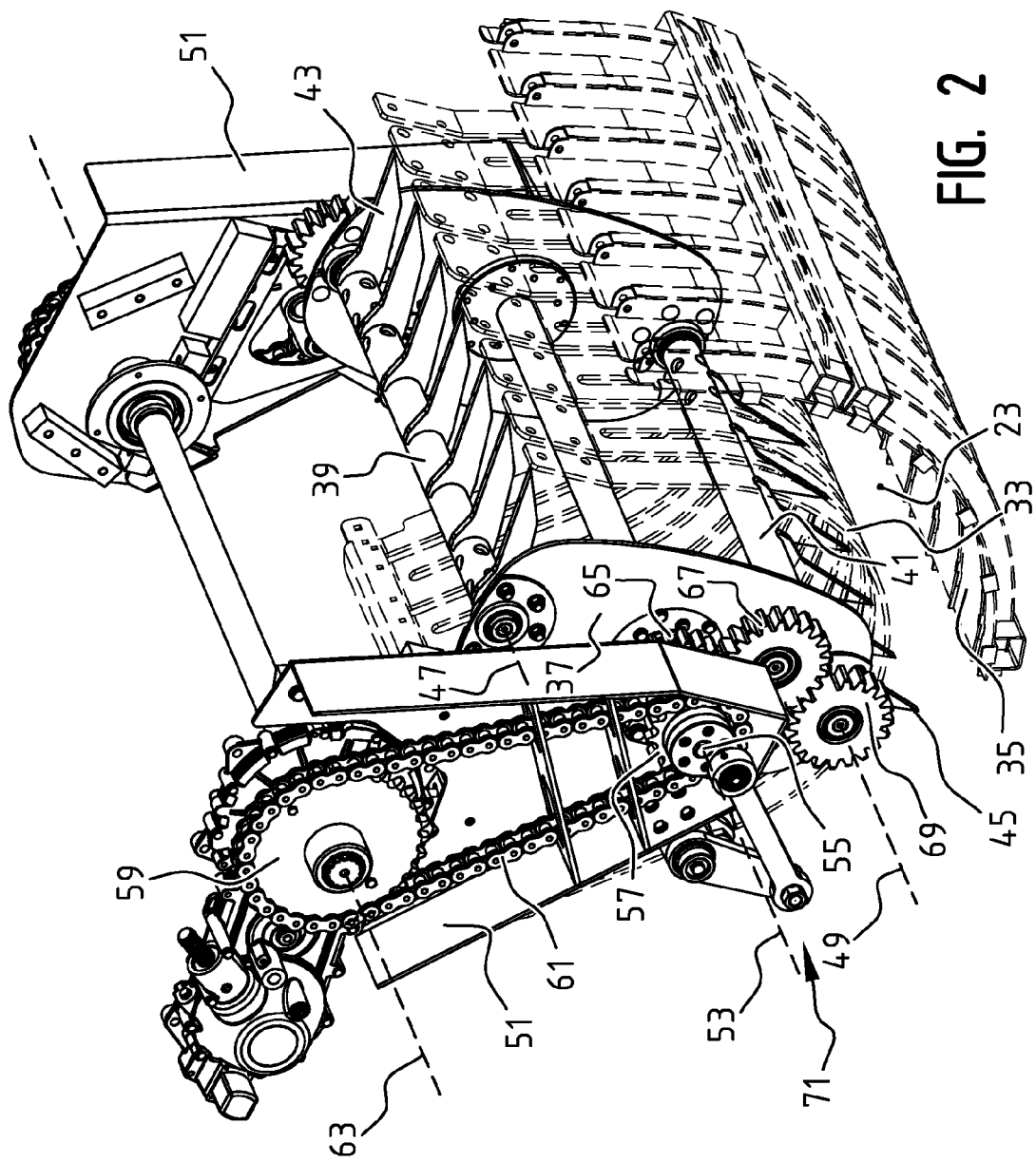
FIG. 2 shows a perspective view of the feeder means of the baler shown in FIG. 1.

In FIG. 2 a part of the feeder duct 23 is shown as well as the feeder means 25. The feeder duct 23 is formed between an upper wall 33 and a lower wall 35. In FIG. 2 only the rear part of the lower wall 35 of the feeder duct 23 is shown. The feeder means 25 are shown with a tine bar holding member formed by drum 37 having rotatable mounted thereon two tine bars 39, 41. Each tine bar 39, 41 is rotatable about its own axis 47, 49, respectively. Each tine bar 39, 41 has mounted thereon a respective set of tines 43, 45. The drum 37 is rotatable mounted on a part 51 of a frame of the baler 1, such that the tine bars 39, 41 are rotatable about a common offset axis 53, being the axis of rotation of the drum 37. Drum 37 is rotatable mounted on the part 51 of the frame by means of a shaft 55 having mounted thereon a gear 57. Gear 57 is drivingly connected to a gear 59 by means of a drive chain 61. Gear 59 is drivingly connected to the input shaft 15. The crank shaft 11a of crank mechanism 11 of the plunger 7 and gear 59 are commonly driven by the input shaft 15 and are rotated with the same rotational speed, such that for each cycle of the reciprocating motion of the plunger 7 along path A, gear 59 makes one revolution about is axis of rotation 63. The gear ratio between gear 59 and gear 57 is 2:1, such that for each revolution of gear 59 about its axis of rotation 63, gear 57, and thereby drum 37, is rotated twice about the offset axis 53. Further shown in FIG. 2 is an arrangement of a set of three gears 65, 67, 69; and a mechanical linkage 71 that is provided for imposing an angular motion of tine bar 41 about its own axis 49 as drum 37 and thereby tine bar 41 is rotated about the offset axis 53. Sun gear 65 is co-axial with the offset axis 53 and is rotatable about offset axis 53 relative to shaft 55 and thus relative to drum 37 and tine bar 41. Gears 67 and 69 provide means drivingly coupling the tine bar 41 to the sun gear 65. The gear ratio of the set of gears 65, 67, and 69 is 1:1, i.e. one revolution of sun gear 65 about the offset axis of rotation 53 results, when the drum 37 is held stationary, in one full rotation of the tine bar 41 about its own axis 49. Mechanical linkage 71 drivingly couples shaft 55 of drum 37 to sun gear 65. This arrangement for imposing an angular motion of tine bar 41 about its own axis 49 as drum 37 and thereby tine bar 41 is rotated about the offset axis 53 will be discussed in more detail under reference to FIG. 3. An arrangement for imposing an angular motion of tine bar 39 about its own axis 47 as drum 37 and thereby tine bar 39 is rotated about the offset axis 53, is located on the opposite side of the drum 37 and will be discussed in more detail under reference to FIGS. 5 and 6.

Figure 3:
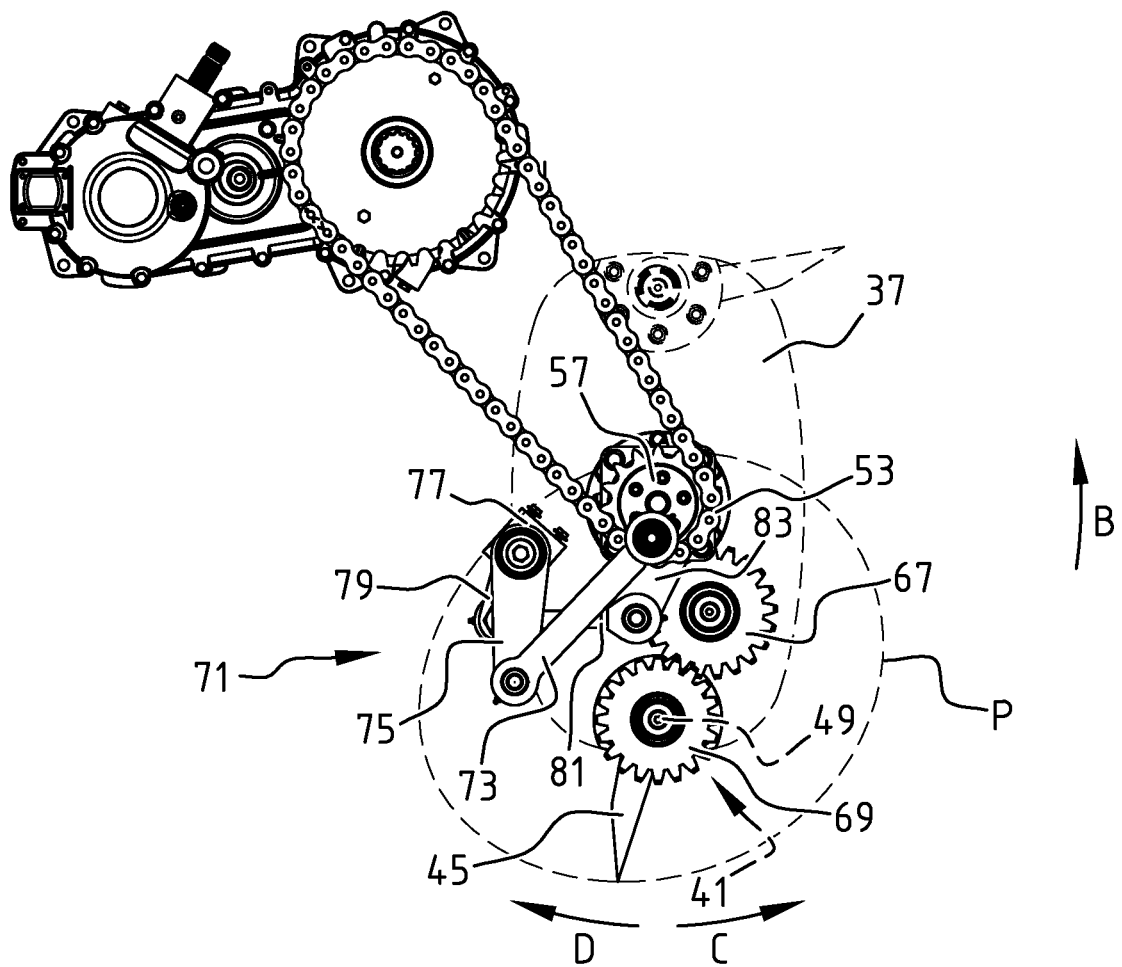
FIG. 3 shows a schematic side view of the feeder means shown in FIG. 2.

In FIG. 3 the arrangement for imposing an angular motion of tine bar 41 about its own axis 49 as drum 37 and thereby tine bar 41 is rotated about the offset axis 53 is shown. Mechanical linkage 71 has a first link 73 that at one end is connected for rotation with gear 57 at a distance from offset axis 53 and that at another end is connected for rotation with a first end of a second link 75. Second link 75 is at an other end pivotally mounted to the part of the frame 51 by means of a mount 77 and fixedly connected to an end of a third link 79. The other end of third link 79 is connected for rotation with an end of a fourth link 81. Fourth link 81 is at another end connected for rotation with the sun gear 65 (not shown in FIG. 3) at a distance from offset axis 53 via a bracket 83 that is fixedly connected to sun gear 65. Rotation of gear 57 and thereby the drum 37 and tine bar 41 in the direction of rotation indicated by arrow B about offset axis 53, is transformed by means of the mechanical linkage 71 into an oscillating motion of sun gear 65 indicated by arrows C and D. From the position of drum 37 shown in FIG. 3, when rotating gear 57 and thereby the drum 37 and tine bar 41 in the direction of rotation indicated by arrow B about offset axis 53, sun gear 65 is first angularly moved by mechanical linkage 71 about offset axis 53 in the direction of arrow C, i.e. the same direction as drum 37. Once the end of the first link 73 is moved above offset axis 53, further rotation of gear 57 and thereby the drum 37 and tine bar 41 in the direction of rotation indicated by arrow B about offset axis 53 is transformed by means of mechanical linkage 71 into an angular movement of sun gear 65 about offset axis 53 in the direction of arrow D, i.e. the direction opposite to the direction of rotation of drum 37. Mechanical linkage 71 mechanically couples angular positions of the drum 37 and thereby tine bar 41 in respect of offset axis 53 to angular positions of the sun gear 65 in respect of offset axis 53. In one full revolution of drum 37 and thereby tine bar 41 about offset axis 53, sun gear 65 is moved through one cycle of its oscillation motion and is returned to its initial angular position. Gears 67 and 69 drivingly couple tine bar 41 to sun gear 65. Rotation of the drum 37 and tine bar 41 in the direction of rotation indicated by arrow B about offset axis 53 is transformed by means of mechanical linkage 71, sun gear 65 and gears 67 and 69, into a rotation of tine bar 41 about its own axis 49 relative to drum 37. The rotation of tine bar 41 about offset axis 53 and the rotation of tine bar 41 about its own axis 49 as tine bar 41 is rotated about offset axis 53 result in a path of movement of the outer ends of the set of tines 45 mounted on tine bar 41. The path of movement of the outer ends of the set of tines 45 mounted on tine bar 41 resulting from the arrangement shown in FIG. 3 is indicated in FIG. 4 as path P that is oval in shape.

In FIGS. 4A to 4F subsequent angular positions of the tine bar 41 about the offset axis 53 are shown, wherein each time drum 37 and thereby tine bar 41 is angularly displaced about offset axis 53 over about 60°. In FIGS. 4B to 4F, the angular position of the sun gear 65 of the previous figure is shown by showing the angular position of the bracket 83 in the previous figure with a dotted line.

Figure 4A:
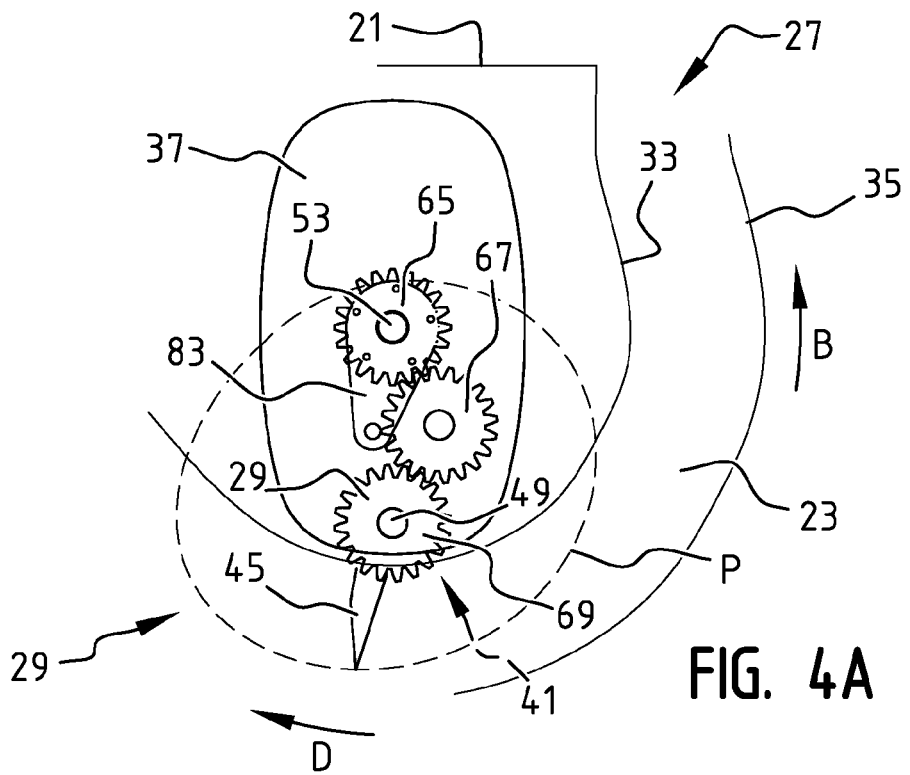
FIG. 4A to 4F show in schematic side view subsequent positions of the feeder means of FIG. 3 during operation.
Figure 4B:
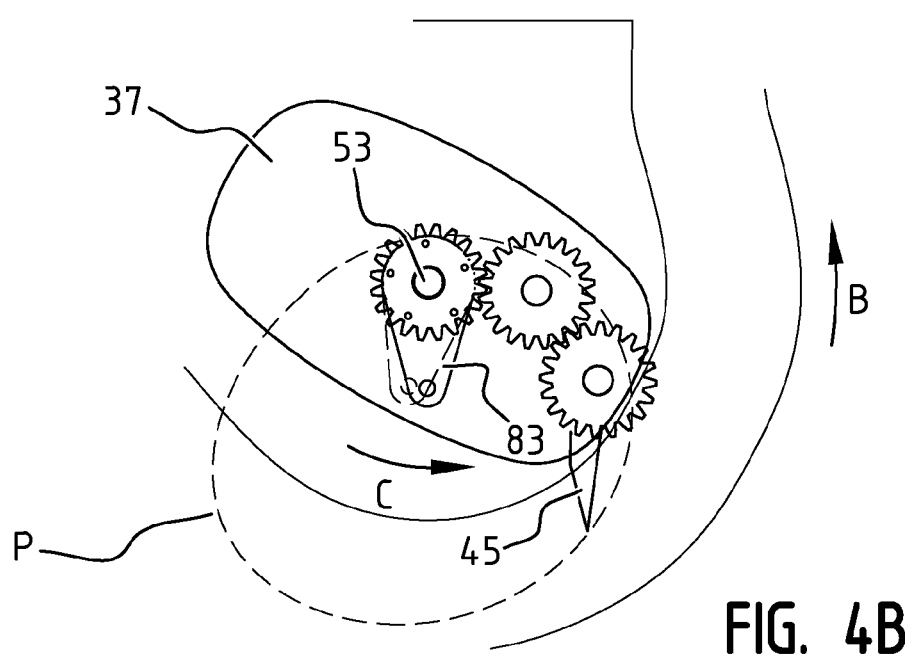
Figure 4C:
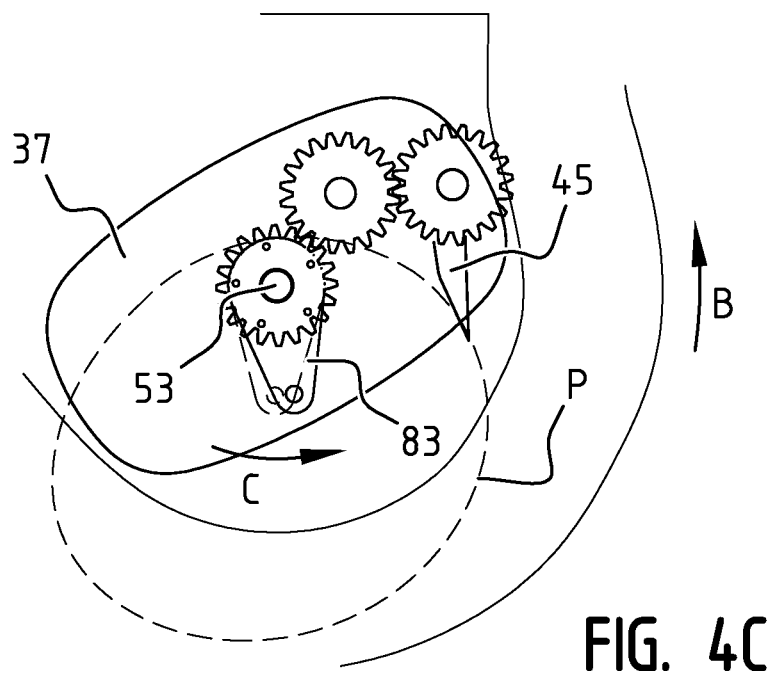
Figure 4D:
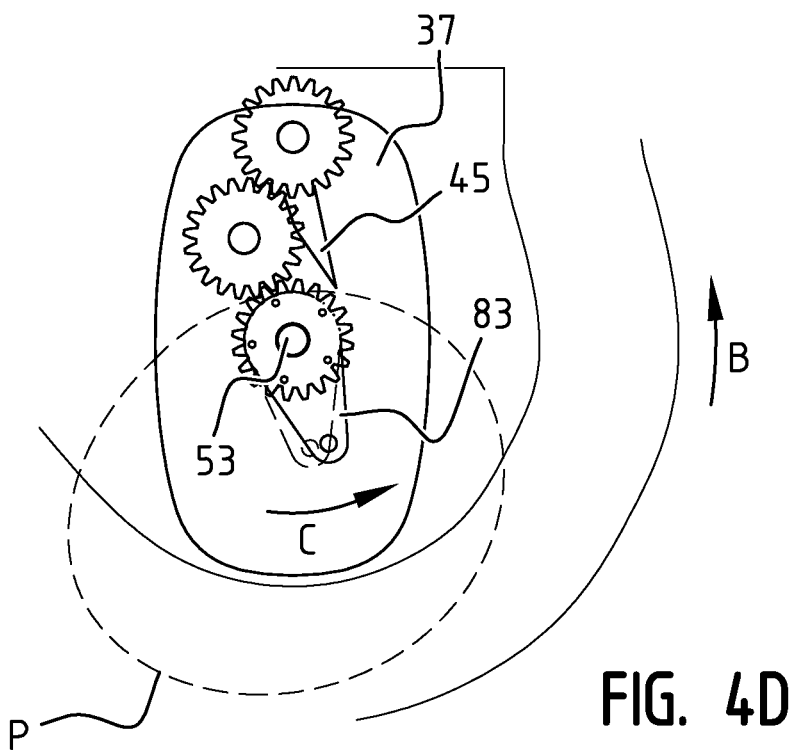
Figure 4E:
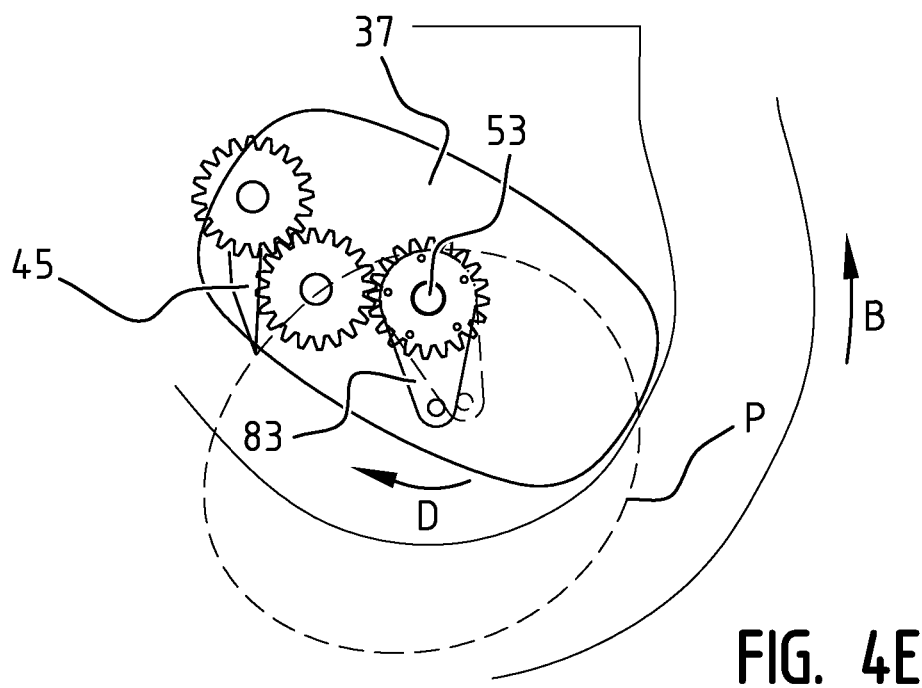
Figure 4F:
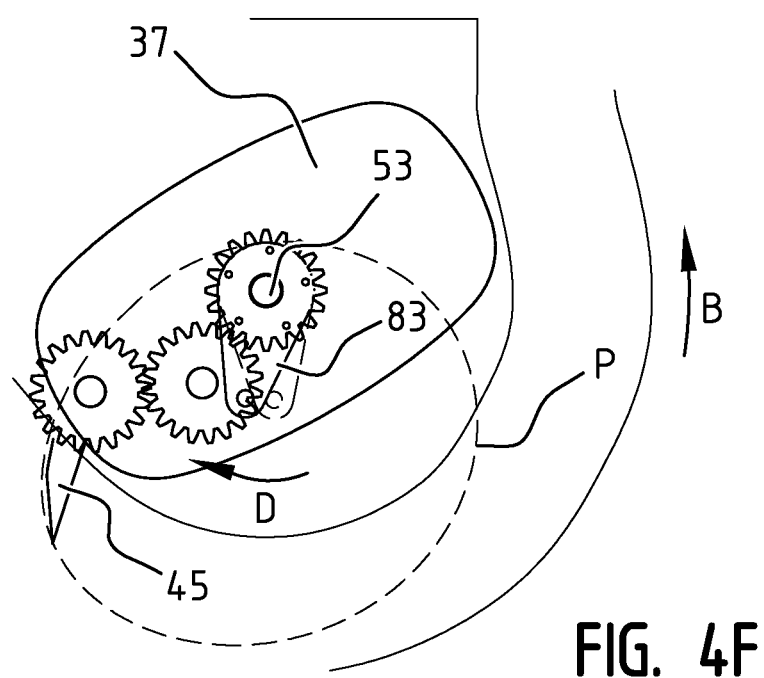

In FIG. 4A are shown drum 37, tine bar 41 with set of tines 45, sun gear 65 with bracket 83, and gears 67, 69. Furthermore, upper wall 33 and lower wall 35 of feeder duct 23 are shown, as well as bottom wall 21 of bale chamber 9. If starting from the angular position of drum 37 shown in FIG. 4A drum 37 would be rotated in the direction of arrow B about offset axis 53 while keeping sun gear 65 stationary relative to the part of the frame of baler 1 on which drum 37 is rotatably mounted, gears 67 and 69 would cause tine bar 41 and thereby the outer ends of the set of tines 45 to rotate about its own axis 49 in the direction of rotation D opposite to the direction of rotation B of the drum 37. Since the gear ratio of the gears 65, 67, 69 is 1:1, the tine bar 41 would rotate about its own axis 49 with the same absolute angular speed as the absolute angular speed of the drum 37. This would result in a circular path of movement of the outer ends of the tines. However, as shown in FIGS. 4B to 4F the angular position of the sun gear 65 is adjusted by means of the mechanical linkage 71 as the tine bare 41 is rotated about the offset axis 53, in particular first by angularly displacing the sun gear 65 about the offset axis 53 in the same direction of rotation as the drum 37 indicated by arrow C, and subsequently by angularly displacing the sun gear 65 about the offset axis 53 in the direction indicated by arrow D opposite to direction of rotation as the drum 37 indicated by arrow B. As a result the absolute angular speed of the tine bar 41 about its own axis of rotation 49 relative to the drum 37 is lower than the absolute angular speed of the drum 37 about the offset axis 53 in a first part of the angular positions of the tine bar 41, while the absolute angular speed of the tine bar 41 about its own axis of rotation 49 relative to the drum 37 is higher than the absolute angular speed of the drum 37 about the offset axis 53 in a second, subsequent part of the angular positions of the tine bar 41. After reaching the situation shown in FIG. 4F, further rotation of the drum 37 about the offset axis 53 results in the situation shown in FIG. 4A. The resulting path of movement P of the outer ends of the set of tines 45 is oval shaped as shown in FIGS. 4A to 4F.

The lengths of the links of the mechanical linkage 71, the distance between the offset axis 53 and the drum gear connection point where the first link 73 is connected for rotation with gear 57, the distance between the offset axis 53 and the sun gear connection point where the fourth link 81 is connected for rotation with the sun gear 65 via bracket 83, the respective angular positions of the drum gear connection point and the sun gear connection point in respect of the offset axis 53, and the location of the mount 77 determine the specific oval shape of the path of movement of the ends of the tines 45. The angular position of the tine bar 41 relative to its own axis 49 when the tine bar 41 is not rotated about the offset axis determines the orientation of the major axis of the oval shape of the path of movement of the ends of the tines 45. In the shown exemplary embodiment said angular position is chosen such that the set of tines 45 reach far into the lower end of the feeder duct 23, thereby being effective in conveying crop material from the lower end 29 of the feeder duct 23 further into the feeder duct 23 towards the upper end, allowing the tines 45 to function as packer tines.

Figure 5:
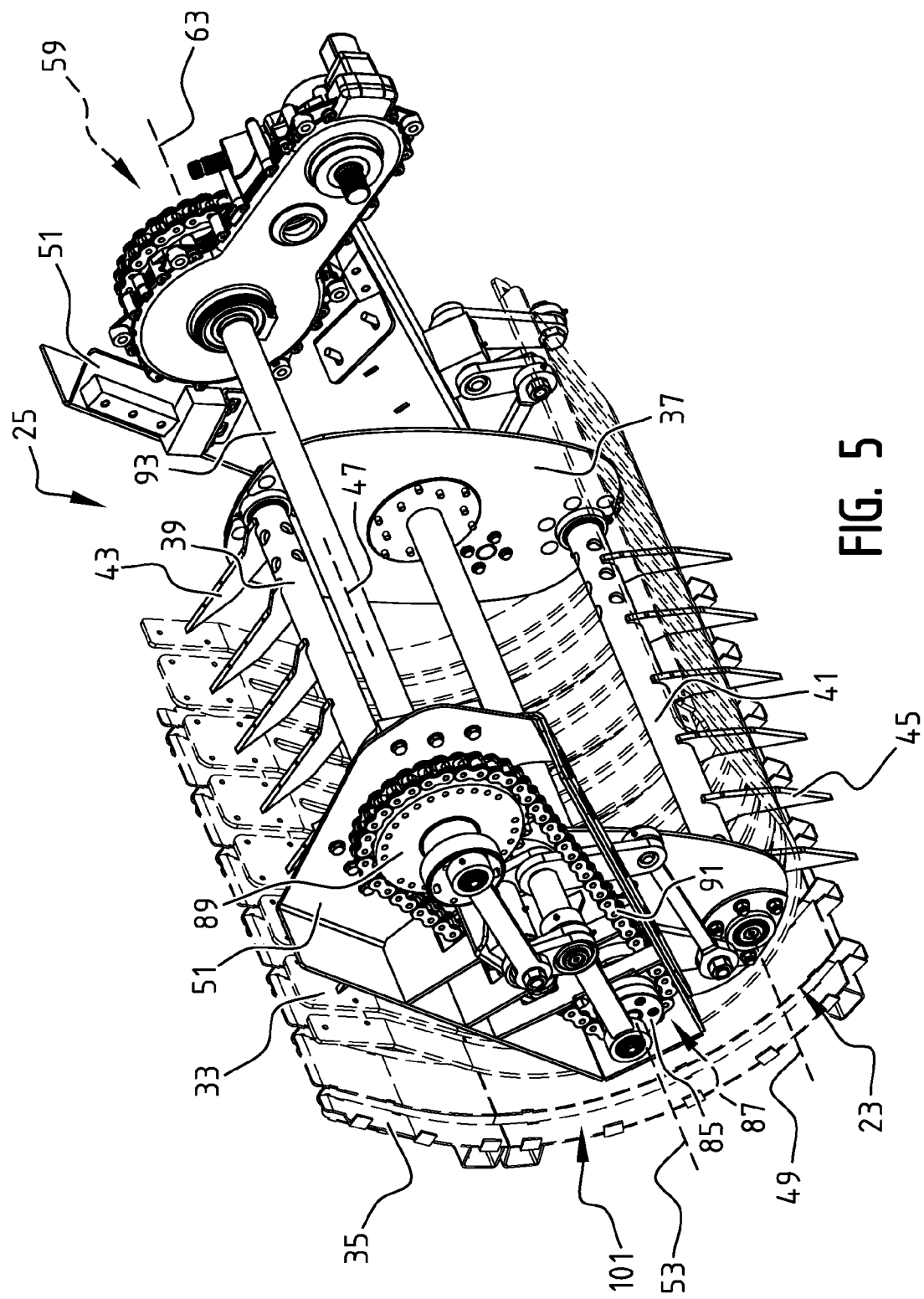
FIG. 5 shows a perspective view of the feeder means shown in FIG. 2 from another side.

In FIG. 5 the part of the feeder duct 23 and the feeder means 25 of FIG. 2 are shown from the other side. The feeder duct 23 is formed between an upper wall 33 and a lower wall 35. In FIG. 5 only the rear part of the lower wall 35 of the feeder duct 23 is shown. The feeder means 25 are shown with a drum 37 having rotatable mounted thereon two tine bars 39, 41. Each tine bar 39, 41 is rotatable about its own axis 47, 49, respectively. Each tine bar 39, 41 has mounted thereon a respective set of tines 43, 45. The drum 37 is rotatable mounted on a part 51 of a frame of the baler 1, such that the tine bars 39, 41 are rotatable about a common offset axis 53, being the axis of rotation of the drum 37. On this side the drum 37 is rotatable mounted on the part 51 of the frame by means of a shaft 85 having mounted thereon a gear 87. Gear 87 is drivingly connected to a gear 89 by means of a drive chain 91. Gear 89 is drivingly connected to the input shaft 15 and is mounted on a shaft 93 together with gear 59 on the other side. The crank shaft 11a of crank mechanism 11 of the plunger 7, gear 59, and gear 89 are commonly driven by the input shaft 15 and are rotated with the same rotational speed, such that for each cycle of the reciprocating motion of the plunger 7 along path A, gear 89 makes one revolution about is axis of rotation 63. The gear ratio between gear 89 and gear 87 is 2:1, such that for each revolution of gear 89 about its axis of rotation 63 gear 87, and thereby drum 37, is rotated twice about the offset axis 53. Similar to the other side shown in FIG. 2, an arrangement of a set of three gears 95, 97, 99 (shown in FIG. 6); and a mechanical linkage 101 is provided for imposing an angular motion of tine bar 39 about its own axis 47 as drum 37 and thereby tine bar 39 is rotated about the offset axis 53. Sun gear 95 (hidden behind part 51 in FIG. 5 and hidden behind gear 87 in FIG. 6) is co-axial with the offset axis 53 and is rotatable about offset axis 53 relative to shaft 85 and thus relative to drum 37 and tine bar 39. Gears 97 and 99 provide means drivingly coupling the tine bar 39 to the sun gear 95. Mechanical linkage 101 drivingly couples shaft 85 of drum 37 to sun gear 95. This arrangement for imposing an angular motion of tine bar 39 about its own axis 47 as drum 37 and thereby tine bar 39 is rotated about the offset axis 53 will be discussed in more detail under reference to FIG. 6.

Figure 6:
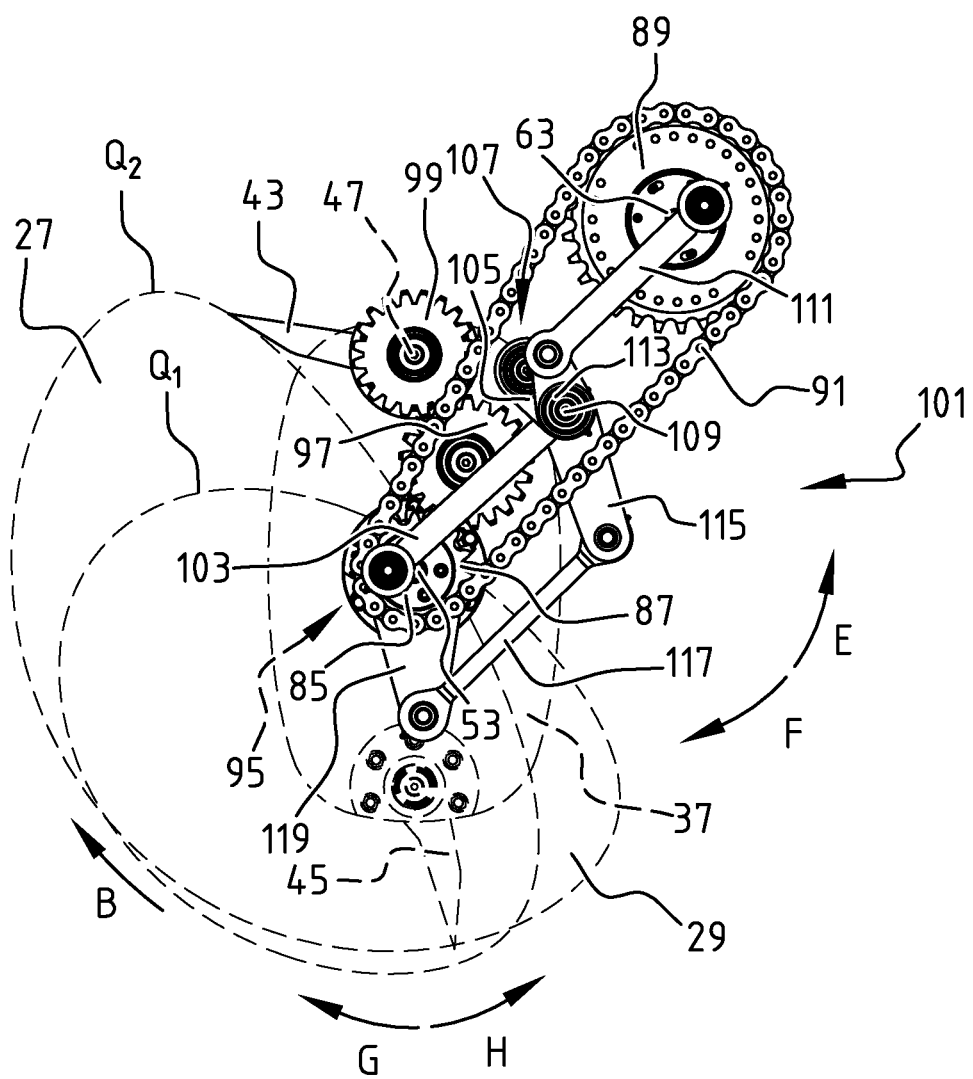
FIG. 6 shows a schematic side view of the feeder means shown in FIG. 5.

In FIG. 6 the arrangement for imposing an angular motion of tine bar 39 about its own axis 47 as drum 37 and thereby tine bar 39 is rotated about the offset axis 53 is shown. Mechanical linkage 101 has a first link 103 that at one end is connected for rotation with gear 87 at a distance from offset axis 53 and that at another end is connected for rotation with a first end of a second link 105. Second link 105 is at another end pivotably mounted to the part of the frame 51 by means of a mount 107. The first link 103 and second link 105 provide an oscillating motion of the common joint 109 at the ends thereof indicated by arrows E and F as drum 37 is rotated about the offset axis 53 in the direction of arrow B. A third link 111 is at one end connected for rotation with gear 89 at a distance from axis 63 and at another end connected for rotation with a first end of a fourth link 113 that at another end is connected for rotation with joint 109 and fixedly connected to a first end of a fifth link 115. Another end of fifth link 115 is connected for rotation with a first end of a sixth link 116. Another end of the sixth link 116 is connected for rotation with the sun gear 95 (not shown in FIG. 6) at a distance from offset axis 53 via a bracket 119 that is fixedly connected to sun gear 95. If joint 109 would be held stationary and gear 89 would be rotated about its axis of rotation 63 in the direction of arrow B, the third link 111, the fourth link 113, the fifth link 115, and the sixth link 116 would result in an oscillating motion of sun gear 95 indicated by arrows G and H based on the angular position of gear 89 in respect of its axis of rotation 63 and thereby based on the position of the plunger 7 in the bale chamber 9. However, as a result of the oscillating motion of joint 109 imposed by the rotation of drum 37 about the offset axis 53 via first link 103 and second link 105, the angular motion of the sun gear 95 is not only based on the position of the plunger 7 in the bale chamber 9, but also based on the angular position of the tine bar 39 in respect of the offset axis 53. Since the gear ratio between the gear 89 and gear 87 is 2:1, the drum 37 makes two revolutions about the offset axis 53 for each single revolution of the gear 89. Consequently, the mechanical linkage 101 couples each angular position of the drum 37 in respect of the offset axis 53 to two angular positions of the sun gear 95 in respect of the offset axis 53, a first angular position during a first revolution of the drum 37 and a second angular position during a subsequent second revolution of the drum 37. The result thereof is that during the first revolution the outer ends of the set of tines 43 have a first path of movement $Q_1$ and that during the subsequent second revolution of drum 37 the outer ends of the set of tines 43 have a second path of movement $Q_2$, wherein the second path starts where the first path ends and vice versa.

In FIGS. 7A to 7L subsequent angular positions of the tine bar 39 about the offset axis 53 are shown, wherein each time drum 37 and thereby tine bar 39 is angularly displaced about offset axis 53 over about 60°. In FIGS. 7A to 7L each time the angular position of the sun gear 95 of the previous figure is shown by showing the angular position of the bracket 119 of the previous figure with a dotted line.

Figure 7A:
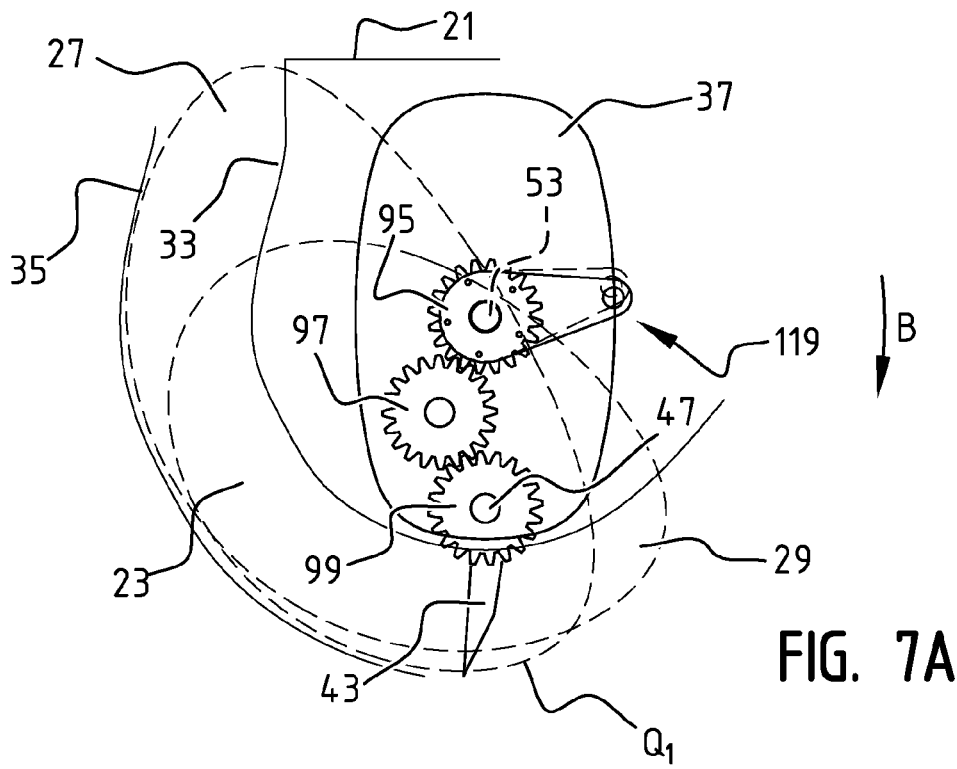
FIG. 7A to 7L show in schematic side view subsequent positions of the feeder means of FIG. 6 during operation.
Figure 7B:
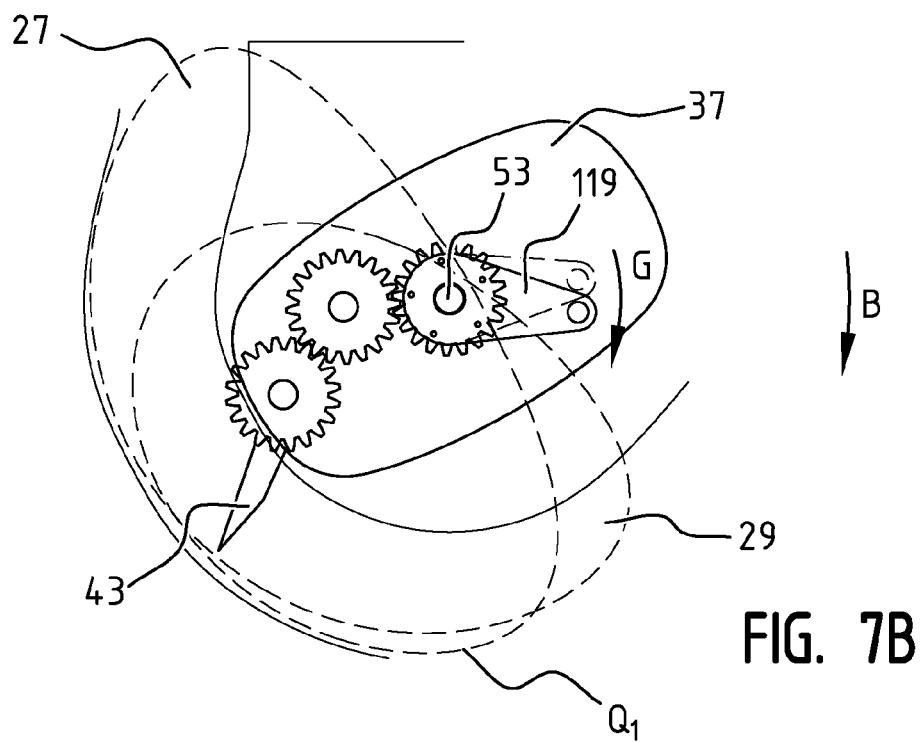
Figure 7C:
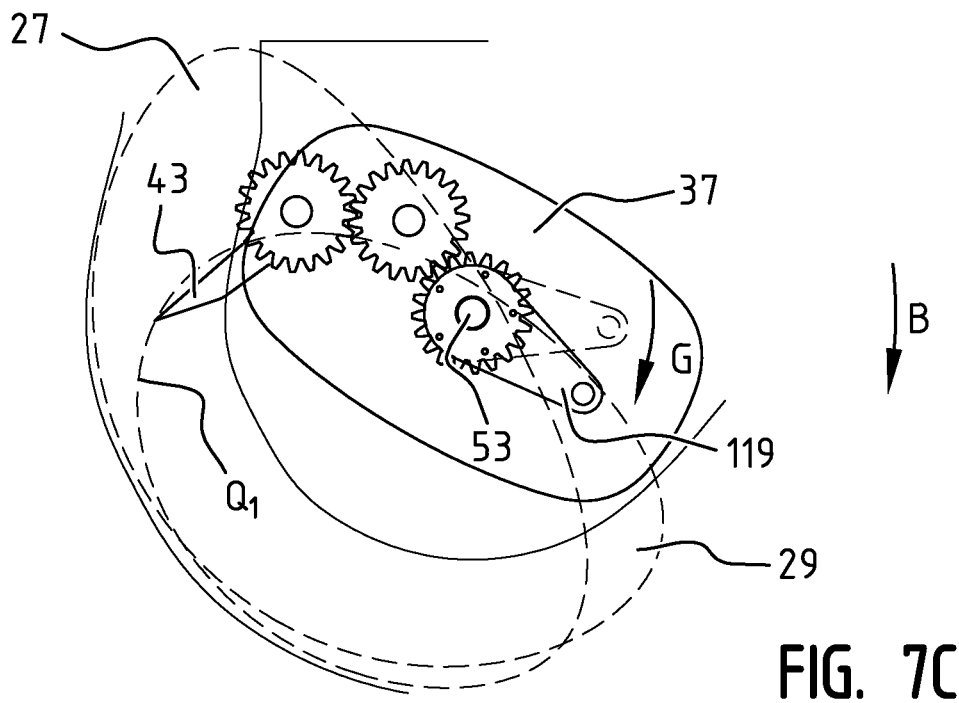
Figure 7D:
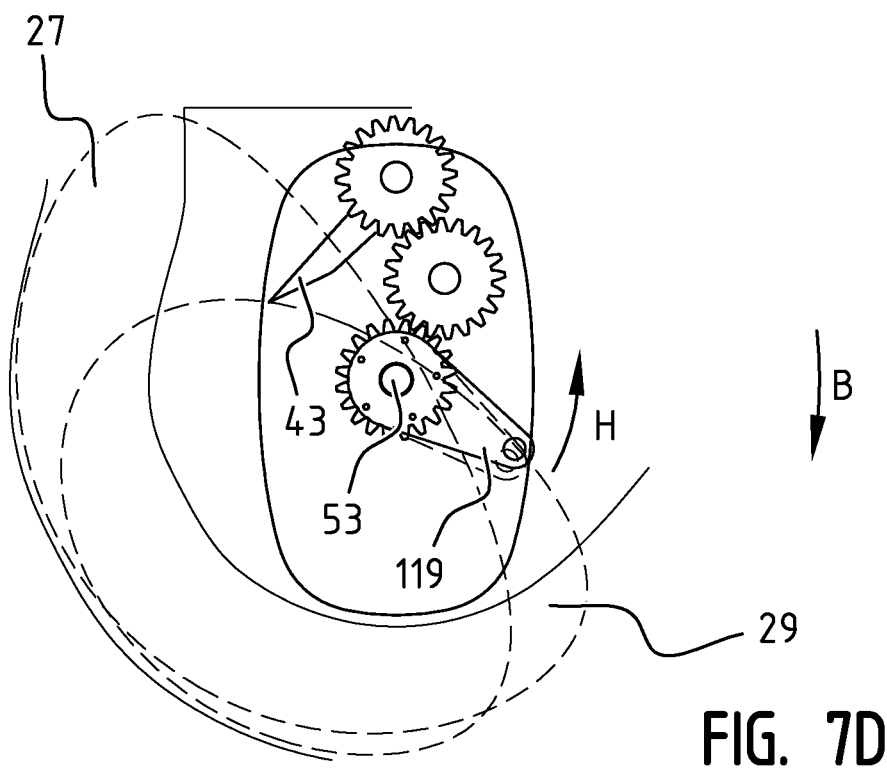
Figure 7E:
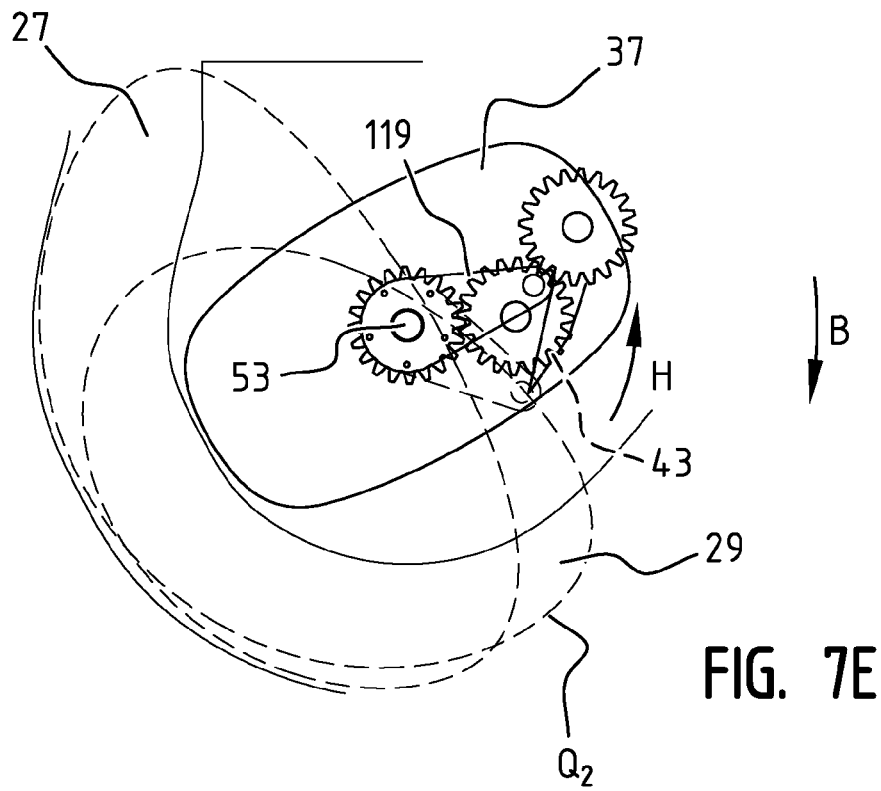
Figure 7F:
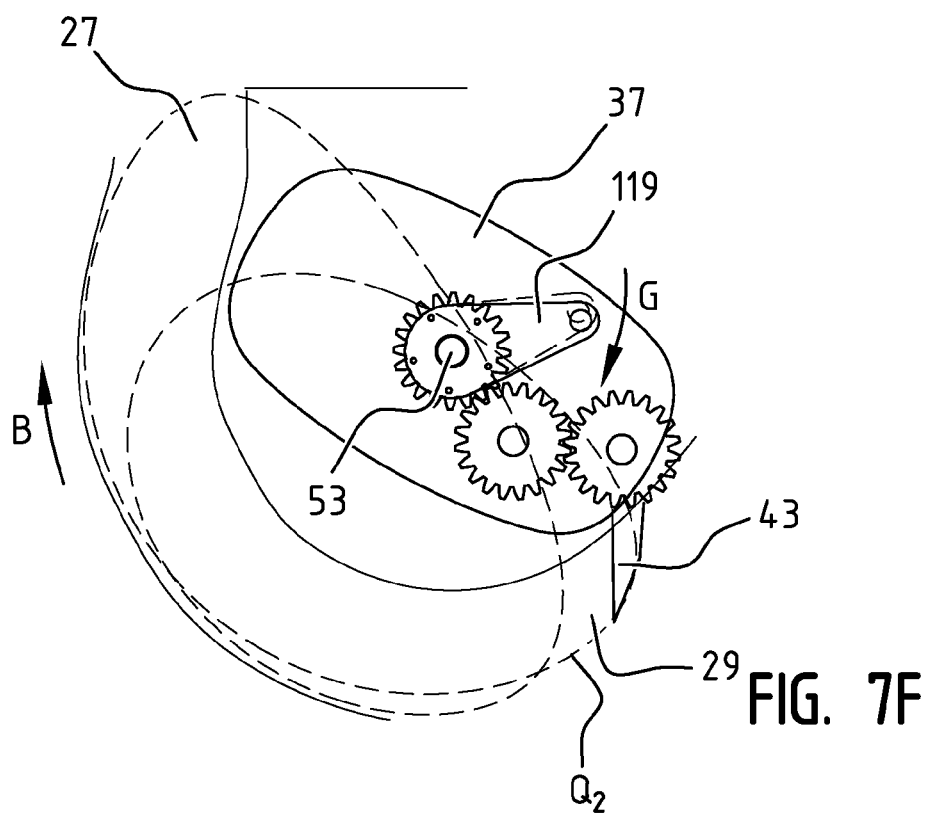

In FIG. 7A are shown drum 37, tine bar 39 with set of tines 43, sun gear 95 with bracket 119, and gears 97, 99. Furthermore, upper wall 33 and lower wall 35 of feeder duct 23 are shown, as well as bottom wall 21 of bale chamberbale chamber 9. If starting from the angular position of drum 37 shown in FIG. 7A drum 37 would be rotated in the direction of arrow B about offset axis 53 while keeping sun gear 95 stationary relative to the part of the frame of baler 1 on which drum 37 is rotatable mounted, gears 97 and 99 would cause tine bar 39 and thereby the outer ends of the set of tines 41 to rotate about its own axis 47 relative to the drum 37 in the direction of rotation indicated by arrow I opposite to the direction of rotation B of the drum 37 about offset axis 53. Since the gear ratio of the gears 95, 97, 99 is 1:1, the tine bar 39 would rotate about its own axis 47 with the same angular speed as the angular speed of the drum 37. This would result in the same circular path of movement of the outer ends of the tines 43 for each revolution of the drum 37 about the offset axis 53, wherein the angular position of the tine bar 39 relative to a vertical line through its own axis 47 would not change.

However, as shown in FIGS. 7A to 7L the angular position of the sun gear 95 is adjusted by means of the mechanical linkage 101 as the tine bare 39 is rotated about the offset axis 53, resulting in an adjusted path of movement Q of the outer ends of the tines 43. The adjusted path of movement Q resembles two superimposed, substantially oval shaped sub paths $Q_1$ and $Q_2$.

Figure 7G:
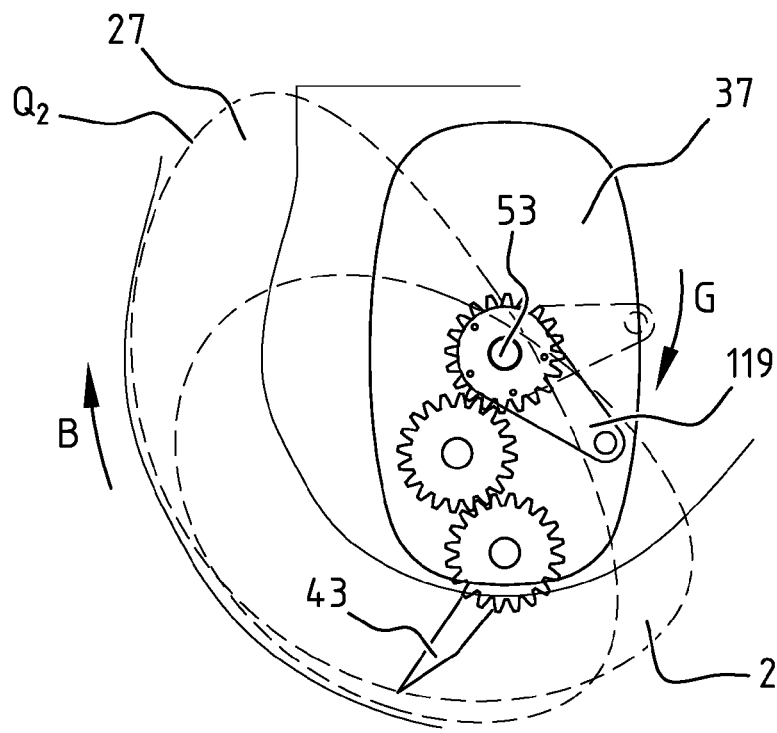
Figure 7H:
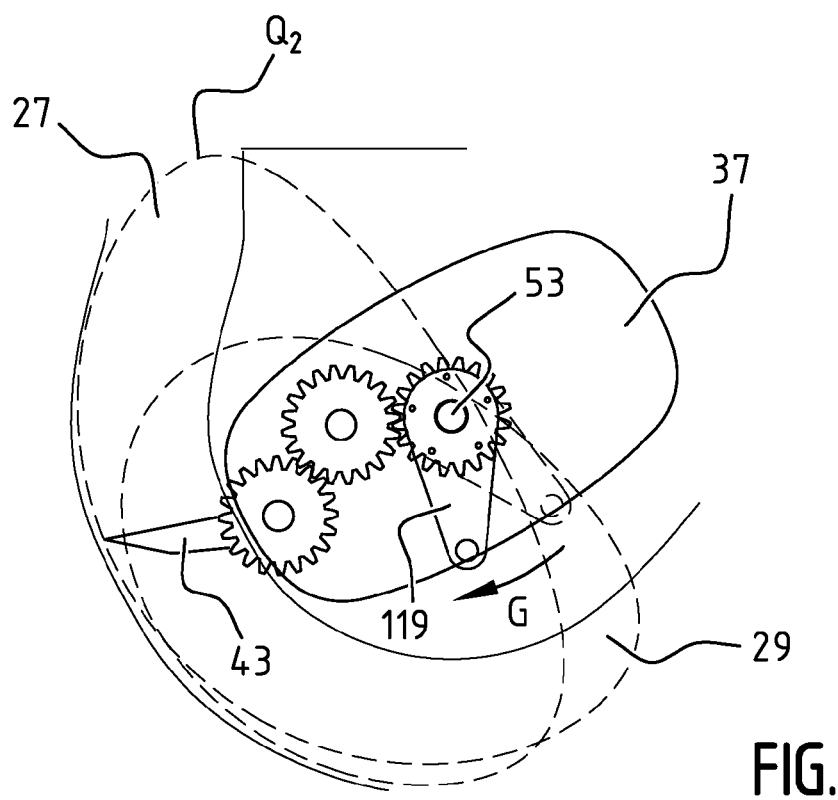
Figure 7I:
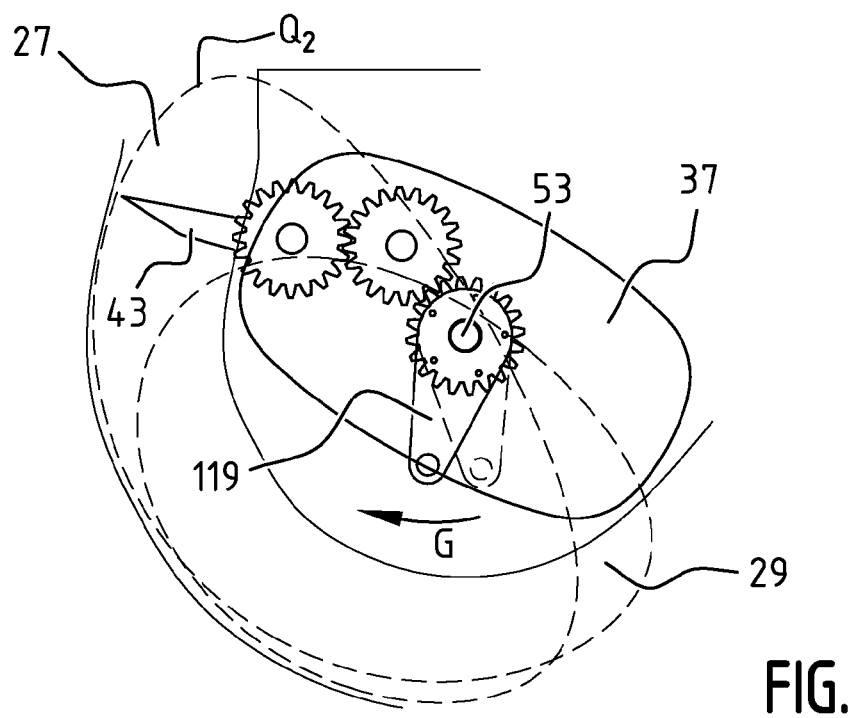
Figure 7J:
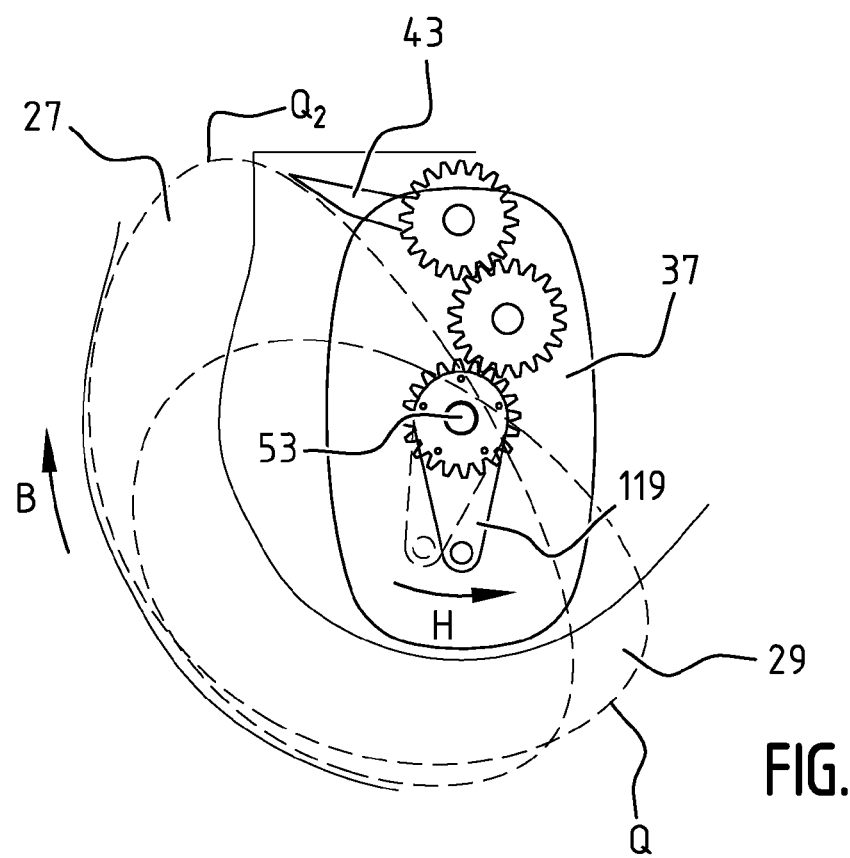
Figure 7K:
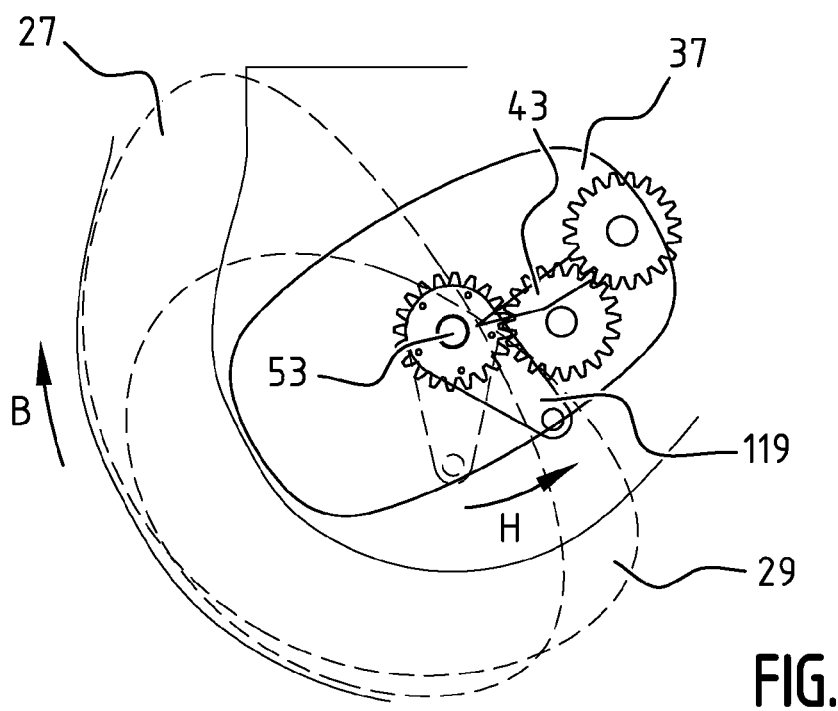
Figure 7L:
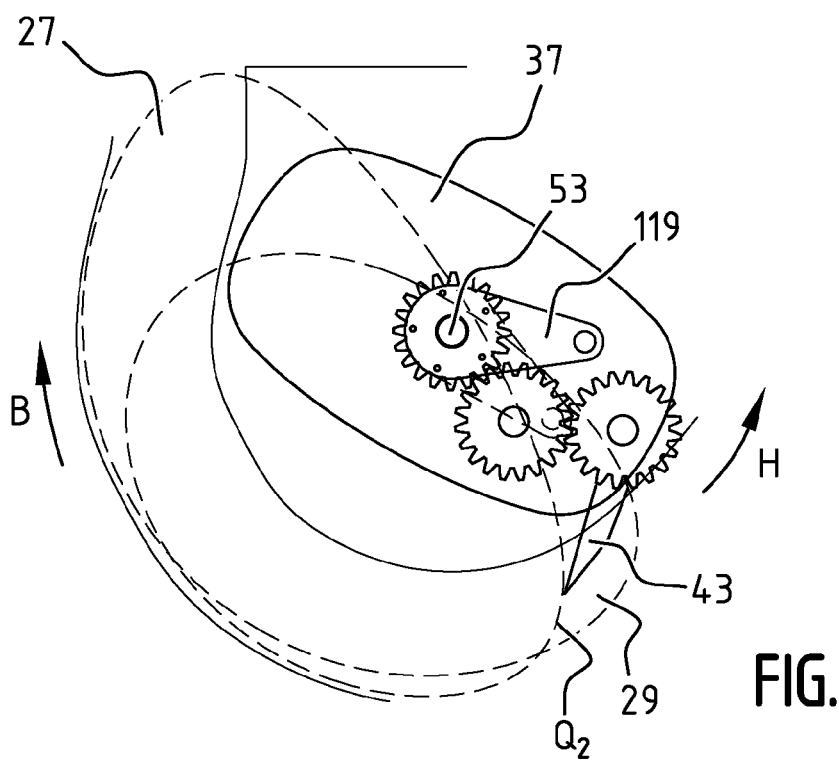

In FIGS. 7A to 7L the drum 37 makes two revolutions about offset axis 53. The first revolution is shown in FIG. 7A, followed by FIGS. 7B to 7F, and FIG. 7G. The second revolution is shown in FIG. 7G, followed by FIGS. 7H to 7L, and FIG. 7A.

As shown in FIGS. 7A to 7G, during the first revolution the sun gear 95 is first angularly displaced about the offset axis 53 in the direction indicated by arrow G being the same direction as the drum 37 indicated by arrow B, and is subsequently angularly displaced about the offset axis 53 in the direction indicated by arrow H opposite to the direction of rotation of the drum 37 indicated by arrow B. As a result, during the first revolution the sun gear 95, the outer ends of the set of tines 43 move along the substantially oval shaped sub path $Q_1$. As shown in FIGS. 7G to 7L, during the second revolution the sun gear 95 is again first angularly displaced about the offset axis 53 in the direction indicated by arrow G the same direction as the drum 37, and is subsequently angularly displaced about the offset axis 53 in the direction indicated by arrow H opposite to the direction of rotation of the drum 37 indicated by arrow B. After reaching the situation shown in FIG. 7L, further rotation of the drum 37 about the offset axis 53 results in the situation shown in FIG. 7A. As a result, during the second revolution of the sun gear 95, the outer ends of the set of tines 43 move along the substantially oval shaped sub path $Q_2$. The sub paths $Q_1$ and $Q_2$ differ in that the substantially oval shape of sub path $Q_2$ is longer along its major axis. The latter is the result of the angular displacement of the sun gear 95 during the second revolution of the drum 37 about the offset axis 53 being greater than the angular displacement of the sun gear 95 during the first revolution of the drum 37. Furthermore, the second sub path $Q_2$ reaches further into the upper end of the feeder duct 23, while the first sub path $Q_1$ reaches further into the lower end of the feeder duct 23. The above two differences between the first sub path $Q_1$ and the second sub path $Q_2$ make the set of tines 43 function as packer tines during the first revolution of the drum 37 and function as stuffer tines during the second revolution of the drum 37.

These differences between the first sub path $Q_1$ and the second sub path $Q_2$ are the result of the mechanical linkage 101. The specific shape of the path Q is determined by the lengths of the links of the mechanical linkage 101, the distance between the offset axis 53 and the drum gear connection point where the first link 103 is connected for rotation with gear 87, the distance between the axis 63 and the plunger gear connection point where the third link 111 is connected for rotation with gear 89, the distance between the offset axis 53 and the sun gear connection point where the sixth link 117 is connected for rotation with the sun gear 95 via bracket 119, the respective angular positions of the drum gear connection point and the sun gear connection point in respect of the offset axis 53, the angular position of the plunger gear connection point in respect of axis 63, and the location of the mount 107.

In the baler 1 according to the invention including the feeder means as described under reference to FIGS. 2 to 7, with each reciprocating cycle of the plunger 7 in the bale chamber 9, drum 37 makes two revolutions about the offset axis 53, wherein each set of tines 43, 45 passes through the feeder duct two times. The outer ends of set of tines 45 follow the path of movement P shown in FIGS. 4A to 4F twice during both revolutions, wherein the set of tines 45 functions as set of packer tines during both revolutions. During the same two revolutions of drum 37, the outer ends of set of tines 43 follow the path of movement Q shown in FIGS. 7A to 7L once, albeit that the position of drum 37 in FIG. 4A corresponds to the position of drum 37 in FIG. 7J. During the first revolution the outer ends of set of tines 43 follow the sub path $Q_1$ when passing through the feeder duct 23, wherein the set of tines 43 functions as set of packer tines. During the second revolution the outer ends of set of tines 43 follow the sub path $Q_2$ when passing through the feeder duct 23, wherein the set of tines 43 functions as set of stuffer tines. During the two revolution, first the set of tines 45 passes through the feeder duct 23 for providing a first packer stroke accumulating crop material in the feeder duct 23, secondly the set of tines 43 passes through the feeder duct for providing a second packer stroke accumulating crop material in the feeder duct 23, thirdly the set of tines 45 passes through the feeder duct for providing a third packer stroke accumulating crop material in the feeder duct 23, and fourthly the set of tines 43 passes through the feeder duct for providing a stuffer stroke stuffing the accumulated charge of crop material via the inlet 19 into the bale chamber 9. While the stuffer stroke is performed, the plunger 7 is at or near the bottom dead center of its reciprocating movement, such that after the charge of material has been stuffed into the base case, said charge is compressed by the plunger 7 in the bale chamber in order to form a bale.

Figure 9:
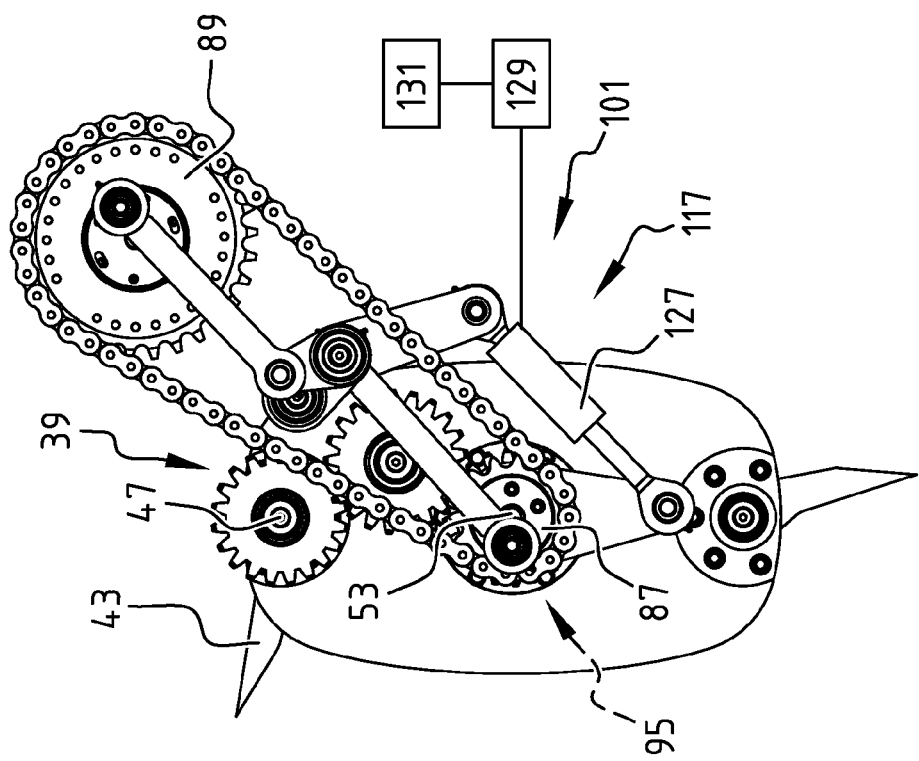
FIG. 9 shows in schematic side view an alternative embodiment of the feeder means shown in FIG. 5.
Figure 8:
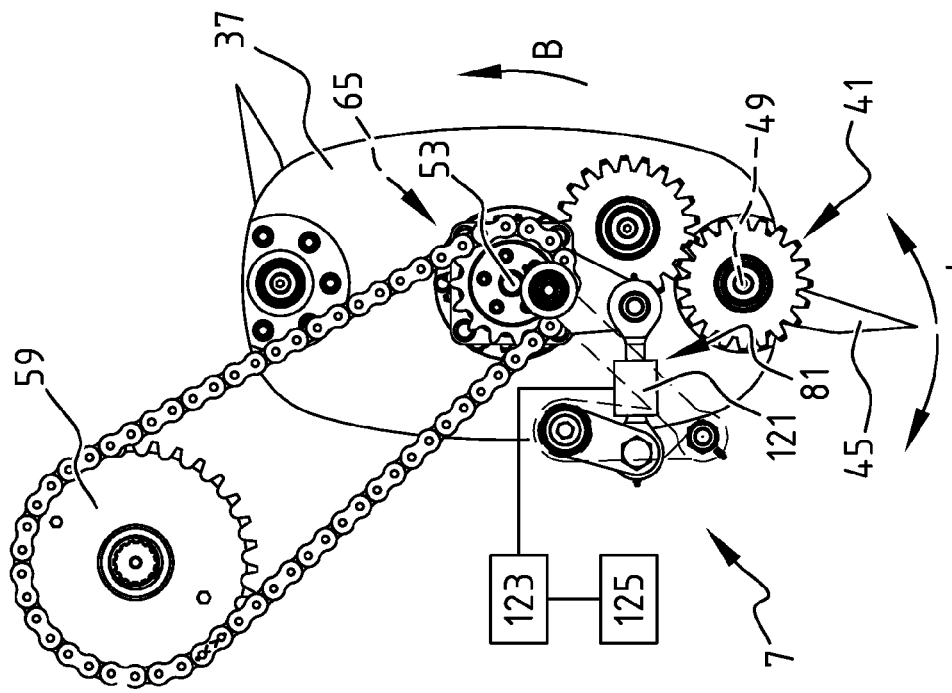
FIG. 8 shows in schematic side view an alternative embodiment of the feeder means shown in FIG. 3.

In FIGS. 8 and 9 alternative configurations are shown for the mechanical linkage 71 and mechanical linkage 101 of FIGS. 3 and 6, respectively.

In FIG. 8 is shown that the fourth link 81 of mechanical linkage 71 that is connected for rotation with the sun gear 65 via bracket 83, comprises a linear actuator 121. The linear actuator 121 is connected to a controller 123 for controlling the actuator 121. By lengthening or shortening the linear actuator 121 via the controller 123, the angular position of the sun gear 65 is adjusted, and thereby the angular position of the tine bar 41 and set of tines 45 in respect of the own axis 49 of the tine bar 41. If for instance the linear actuator 121 is lengthened while drum 37 is held stationary, sun gear 65 is angularly displaced about offset axis 53 in the direction of arrow I, resulting in an angular displacement of tine bar 41 about its own axis 49 in the direction of arrow I. If for instance the linear actuator 121 is shortened while drum 37 is held stationary, sun gear 65 and tine bar 41 are angularly displaced in opposite direction indicated by arrow J. By such angular displacement of the sun gear 65 and tine bar 41, the path of movement P imposed by the mechanical linkage 71 can be adjusted. By lengthening or shortening the linear actuator 121, before or while rotating the drum 37 about the offset axis 53, and subsequently keeping the chosen length, the orientation of major axis of the oval shaped path of movement shown in FIGS. 4A to 4F is changed as discussed herein above under reference to FIGS. 4A to 4F. Depending on the type of crop material and its state (e.g. wet or dry) it may be advantageous to adjust the sun gear 65 such that the path of movement of the outer ends of the set of tines 43 reach further in the lower end of the feeder duct 23 and less far in the remaining part of the feeder duct 23, or vice versa to adjust the sun gear 65 such that the path of movement of the outer ends of the set of tines 43 reach less far in the lower end of the feeder duct 23 and further in the remaining part of the feeder duct 23.

It would also be possible to connect sensor means 125 to the controller 123, configure said sensor means 125 for sensing the load on the set of tines 45, and configure the controller 123 to adjust the angular position of the sun gear 65 based on the sensed value of the sensor means for sensing load, such that when the load exceeds a certain value, the linear actuator 121 is shortened, thereby causing the tine bar 41 and the set of tines 45 to be angularly displaced about the own axis 49 of the tine bar 41 in the direction indicated by arrow J opposite to the direction of rotation of the drum 37 about the offset axis 53 indicated by arrow B (in addition to the angular displacement imposed by the mechanical linkage 71), thereby preventing the load on the set of tines to further increase. Such an additional adjustment based on the load on the tines could serve as an overload protection for the set of tines, but could also serve to provide a limit for the compression of the accumulated crop material in the feeder duct 23.

Furthermore, it would be possible to continuously adjust the angular position of the sun gear 65 in respect of offset axis 53 and thereby the angular position of the tine bar 41 in respect of its own axis 49 relative to the drum 37, as the drum 37 is rotated about the offset axis 53 in addition to the adjustment imposed by the mechanical linkage 71, in order to further adjust the path of movement of the outer ends of the tines 45. In that case advantageously sensor means 125 would be provided configured for sensing the angular position of the drum 37 in respect of the offset axis 53, and the controller 123 would be configured to adjust the length of the linear actuator 121 and thereby the angular position of the sun gear 65 on the basis of the sensed angular position of the drum 37. It would even be possible to have controller 123 controlling actuator 121 such that linkage 71 provides the paths of movement $Q_1$ and $Q_2$ shown in FIGS. 7A to 7L. The mechanical linkage 71 including actuator 121 could thus replace mechanical linkage 101 shown in FIG. 6.

In FIG. 9 is shown that the sixth link 117 of mechanical linkage 101 that is connected for rotation with the sun gear 95 via bracket 119, is replaced with a linear actuator 127. The linear actuator 127 is connected to a controller 129 for controlling the actuator 127. By lengthening or shortening the linear actuator 127 via the controller 129, the angular position of the sun gear 95 is adjusted, and thereby the angular position of the tine bar 39 and set of tines 43 in respect of the own axis 47 of the tine bar 39. With such linear actuator 127 and controller 129 connected therewith the same possibilities of angular displacement of the sun gear 95 in addition to the angular adjustment imposed by the mechanical linkage 101 as with the linear actuator 121 and controller 123 in the configuration shown in FIG. 8 and discussed herein above under reference to FIG. 8. An additional possibility would be the suppression of the stuffer stroke. As discussed herein above under reference to FIGS. 7A to 7L, the mechanical linkage 101 is configured such that during a second revolution of the drum 37 about offset axis 53, the angular displacement of the sun gear 95 is greater than the angular displacement of the sun gear 95 during the preceding first revolution of the drum 37 about offset axis 53, thereby causing the ends of the set of tines 43 to move along a first sub path $Q_1$ during the first revolution wherein the set of tines 43 perform a packer stroke and causing the ends of the set of tines 43 to move along a second sub path $Q_2$ during the second revolution wherein the set of tines 43 perform a stuffer stroke. By means of the linear actuator 127 and controller 129, it would be possible to suppress during the second revolution of the drum 37 the angular displacement of the sun gear 95 to the extent that the angular displacement of the sun gear 95 is similar to the angular displacement of the sun gear 95 during the first revolution, such that the set of tines 43 perform a packer stroke instead of a stuffer stroke. This could be achieved by providing sensor means 131 to be connected to the controller 129 that are configured to sense the angular position of the gear 89, the angular position of the gear 87, and the angular position of the sun gear 95, and by configuring the controller 129 to control the actuator 127 such that through the range of angular positions of the drum 37, i.e. angular positions of gear 87, where the stuffer stroke would be performed, the angular displacement of the sun gear 95 is partly counter acted. This would allow for stuffing once each two or more cycles of the reciprocating motion of the plunger 7 in the bale chamber 9.

Figure 11:
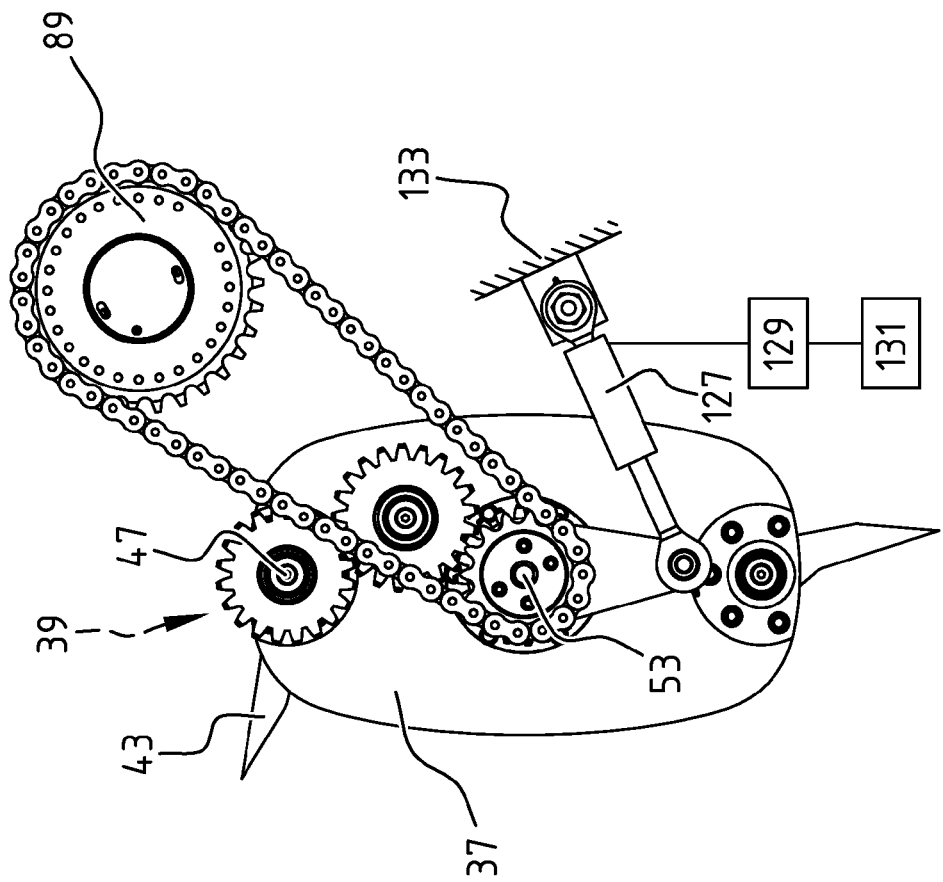
FIG. 11 shows in schematic side view a further alternative embodiment of the feeder means shown in FIG. 5 and shown in FIG. 9.
Figure 10:
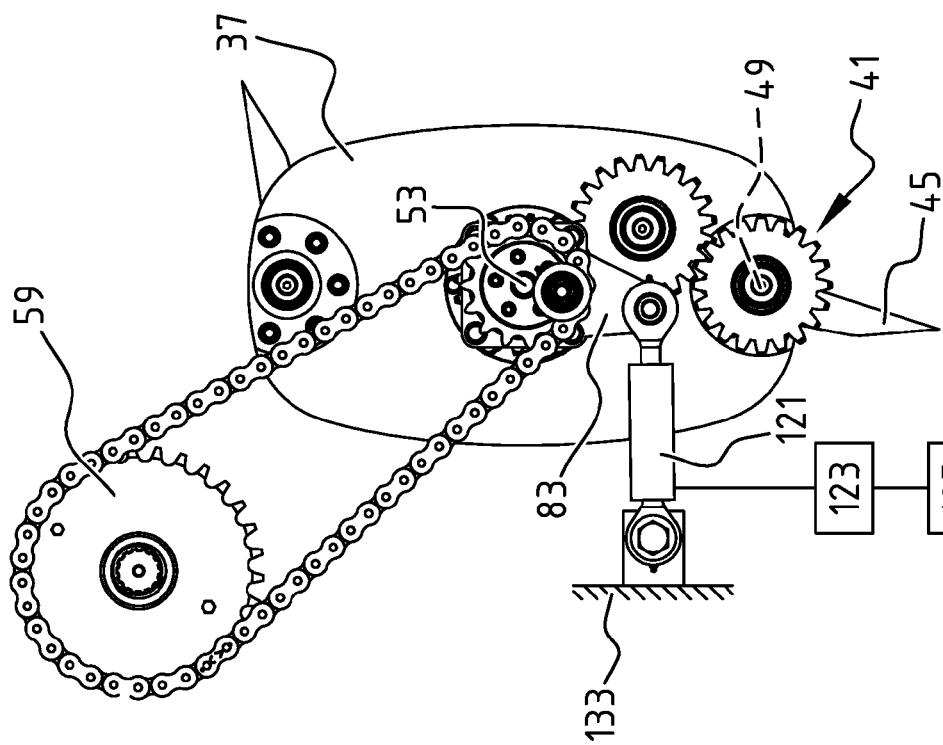
FIG. 10 shows in schematic side view a further alternative embodiment of the feeder means shown in FIG. 3 and shown in FIG. 8.

In FIGS. 10 and 11 further alternative configurations are shown for the mechanical linkage 71 and mechanical linkage 101 of FIGS. 3 and 6, respectively, as well as for the configurations shown in FIGS. 8 and 9.

In FIG. 10 mechanical linkage 71 has been completely replaced with a linear actuator 121 that directly engaged bracket 83 at one end and is mounted with the other end on part 133 of the frame of the baler, such that lengthening and subsequent shortening of the linear actuator 121 provides an oscillating motion of the sun gear 65 about the offset axis 53. A controller 123 has been provided for controlling the linear actuator 121. Furthermore, sensor means 125 are provided connected to the controller 123 for sensing at least one operational parameter of the baler 1, such as the angular position of the tine bar 41 in respect of the offset axis 53. The controller 123 can be configured to control the actuator 121 based on the sensed angular position of the tine bar 41 in respect of the offset axis 53 such that an oscillating motion is imposed on the sun gear 65 as the drum 37 is rotated about the offset axis 53, that is the same as or similar to the oscillating motion imposed by mechanical linkage 71. Alternatively, the linear actuator 121 could be replaced with a rotary actuator that directly engages the sun gear 65 for imposing the oscillating motion on sun gear 65. In case a rotary actuator is used that directly engages the sun gear 65 and sun gear 65 and gear 69 are drivingly coupled such that they rotate in opposite direction, the same effect reached with the oscillating motion of the sun gear 65 can be reached by alternately accelerating and decelerating sun gear 65 while rotating sun gear 65 in the same direction. A controller 123 and sensor means 125 connected therewith are provided in order to control directly engaging linear actuator 121 or rotary actuator on the basis of at least one operational parameter of the baler 1 such that a desired path of movement of the outer ends of the set of tines 45 of the tine bar 41 is achieved.

In FIG. 11 mechanical linkage 101 has been completely replaced with linear actuator 127, that alternatively is a rotary actuator, directly engaging the sun gear 95 at one end mounted with the other end on part 133 of the frame of the baler. Here the same applies as is described under reference to FIG. 10. With a properly configured controller 129 and relevant sensor means 131 the angular position of the sun gear 95 can be adjusted as the tine bar 39 is rotated about the offset axis 53 such that the ends of the tines 43 are moved along a path of movement that is the same as or similar to path of movement Q imposed by mechanical linkage 101.

Although the feeder means of the embodiment of baler 1 shown in the FIGS. 1 to 11 is provided with two tine bars, feeder means of a baler according to the invention can also be provided with one tine bar or with more than two tine bars. For instance, in an alternative embodiment, the feeder means are only provided with tine bar 39 and the mechanical linkage 101 associated therewith. In that case, each two revolutions of the drum 37 there is one packer stroke and one stuffer stroke.

Although the principles of the invention have been set forth above with reference to specific embodiments, it must be understood that this description is given solely by way of example and not as limitation to the scope of protection, which is defined by the appended claims.

The invention claimed is:

1. An agricultural baler, comprising:
   a bale chamber having an inlet opening formed therein;
   a feeder duct communicating with the bale chamber through the inlet opening for charges of crop material to be transferred from the feeder duct into the bale chamber;
   a plunger reciprocable within the bale chamber to compress successive charges of crop material received from the feeder duct to form a bale; and
   a feeder operable within the feeder duct to accumulate a charge of crop material therein and then stuff that accumulated charge into the bale chamber, the feeder comprising:
   a tine bar holding member having rotatably mounted thereon at least one tine bar having mounted thereon a set of tines, the tine bar being rotatable about its own axis relative to the tine bar holding member and being rotatable together with the tine holding member about an offset axis;
   a sun gear co-axial with and rotatable about the offset axis relative to the tine bar holding member;
   a mechanical coupling drivingly coupling the tine bar to the sun gear, such that as the tine bar is rotated about the offset axis and the sun gear co-axially therewith is held stationary, the mechanical coupling drivingly coupling the tine bar to the sun gear causes the tine bar to rotate about its own axis relative to the tine bar holding member, and outer ends of the set of tines to follow a path of movement; and
   an adjustment system configured for active adjustment of an angular position of the sun gear about the offset axis as the tine bar is rotated about the offset axis.

2. The baler according to claim 1, wherein the adjustment system comprises a mechanical linkage coupling angular positions of the sun gear relative to the offset axis to angular positions of the tine bar relative to the offset axis, and wherein the mechanical linkage is configured for transforming angular motion of the tine bar about the offset axis into angular motion of the sun gear about the offset axis.

3. The baler according to claim 2, wherein the mechanical coupling is adapted to cause the tine bar to rotate about its own axis relative to the tine holding member in a direction opposite to a direction of rotation of the tine bar about the offset axis as the tine bar is rotated about the offset axis and the sun gear is held stationary, wherein an absolute angular speed of the tine bar about its own axis is the same as an absolute angular speed of the tine bar about the offset axis; and wherein the mechanical linkage is further configured for transforming a rotational motion of the tine bar about the offset axis into an oscillating motion of the sun gear about the offset axis.

4. The baler according to claim 3, wherein the mechanical linkage comprises an arrangement for additionally adjusting the angular position of the sun gear relative to the offset axis.

5. The baler according to claim 4, wherein the arrangement for additionally adjusting the angular position of the sun gear relative to the offset axis is adapted to additionally adjust the angular position of the sun gear relative to the offset axis based on at least one operational parameter of the baler.

6. The baler according to claim 4, wherein the arrangement for additionally adjusting the angular position of the sun gear relative to the offset axis comprises an arrangement for amplifying the oscillating motion of the sun gear based on the position of the plunger in the bale chamber.

7. The baler according to claim 6, wherein the mechanical linkage coupling angular positions of the sun gear relative to the offset axis to angular positions of the tine bar relative to the offset axis comprises a plurality of links mutually coupled at joints, wherein the plurality of links comprises a link having a first joint and a second joint, the link being pivotable about a pivot axis offset from the joints thereby providing transformation of a motion of the first joint into a motion of the second joint, wherein the motion of the second joint results in an angular displacement of the sun gear about the offset axis; and wherein the arrangement for amplifying the oscillating motion of the sun gear is configured for moving the pivot axis in a direction opposite to a direction of motion of the first joint along a path for amplification of the angular displacement of the sun gear.

8. The baler according to claim 7, further comprising a crank mechanism for driving the plunger, the crank mechanism comprising a crank rotatable about a crank axis and a linkage for transforming a rotational motion of the crank into the reciprocating motion of the plunger in the bale chamber, wherein the arrangement for amplifying the oscillating motion of the sun gear comprises a mechanical linkage adapted for transforming the rotational motion of the crank into an oscillating motion of the link about the pivot axis.

9. The baler according to claim 4, wherein the mechanical linkage comprises at least one link comprising a length adjustor for adjusting a length of the link.

10. The baler according to claim 9, wherein the length adjustor comprises resilient means urging the link into a first length and permitting changing the length in response to a load on the link.

11. The baler according to claim 1, wherein the adjustment system comprises:

an actuator arranged for angular displacement of the sun gear about the offset axis as the tine bar is rotated about the offset axis;

a sensor for sensing at least one operational parameter of the baler; and a controller connected to the actuator for controlling the actuator and connected to the sensor for receiving the operational parameter, wherein the controller is adapted for controlling the actuator on the basis of the operational parameter received from the sensor.

12. The baler according to claim 11, wherein the actuator is arranged for direct angular displacement of the sun gear, in order to engage the sun gear or couple to the sun gear by a transmission.

13. The baler according to claim 12, wherein the actuator is a linear actuator, and the mechanical coupling is adapted to cause the tine bar to rotate about its own axis in a direction opposite to a direction of rotation of the tine bar about the offset axis as the tine bar is rotated about the offset axis and the sun gear is held stationary, wherein an absolute angular speed of the tine bar about its own axis is the same as an absolute angular speed of the tine bar about the offset axis.

14. The baler according claim 11, wherein the actuator is a rotary actuator.

15. The baler according to claim 9, wherein the length adjustor comprises an actuator arranged for angular displacement of the sun gear about the offset axis as the tine bar is rotated about the offset axis, and wherein the actuator is a linear actuator.

16. The baler according to claim 11, wherein the at least one operational parameter of the baler includes an angular position of the tine bar relative to the offset axis.

17. The baler according to claim 11, wherein the at least one operational parameter of the baler includes the load on the set of tines, wherein the sensor comprises at least one sensor for sensing the load.

18. The baler according to claim 17, wherein the controller is further adapted to control the actuator to adjust the angular position of the sun gear such that the tine bar is rotated about its own axis in a direction opposite to a direction of rotation of the tine bar about the offset axis in case the load on the set of tines exceeds a predetermined value as the tine bar is rotated about the offset axis.

19. The baler according to claim 1, wherein the tine bar holding member has multiple tine bars rotatable mounted thereon, each tine bar having mounted thereon a set of tines, and each tine bar being rotatable about its own axis relative to the tine bar holding member and being rotatable together with the tine bar holding member about the offset axis, wherein at least two of the tine bars are drivingly coupled to a respective sun gear co-axial with and rotatable about the offset axis, such that as each of the two tine bars is rotated about the offset axis and the respective sun gear drivingly connected thereto is held stationary, the mechanical coupling drivingly coupling the each tine bar to the respective sun gear causes the each tine bar to rotate about its own axis and outer ends of the set of tines of the each tine bar to follow a path of movement, and wherein for each of the sun gears a respective path of movement adjustment system is provided configured for active adjustment of a path of movement of the outer ends of the set of tines mounted on each tine bar drivingly coupled to the respective sun gear by angular motion of the respective sun gear about the offset axis as the each tine bar is rotated about the offset axis.

20. The baler according to claim 1, wherein the tine bar holding member has multiple tine bars rotatable mounted thereon, each tine bar having mounted thereon a set of tines; and each tine bar being rotatable about its own axis relative to the tine bar holding member and being rotatable together with the tine bar holding member about the offset axis;

wherein at least two of the tine bars are drivingly coupled to the same sun gear, such that as the at least two tine bars are rotated about the offset axis and the sun gear co-axially therewith is held stationary, the mechanical coupling causes each of the at least two tine bars to rotate about its own axis relative to the tine bar holding member, and outer ends of the set of tines mounted thereon to follow a path of movement.

21. The baler according to claim 1, wherein the adjustment system is configured for active adjustment based on at least one operational parameter of the baler, the at least one operational parameter of the baler preferably including an angular position of the tine bar relative to the offset axis.

22. A method for operating an agricultural baler comprising:
a bale chamber having an inlet opening formed therein;
a feeder duct communicating with the bale chamber through the inlet opening for charges of crop material to be transferred from the feeder duct into the bale chamber;
a plunger reciprocable within the bale chamber to compress successive charges of crop material received from the feeder duct to form a bale; and
a feeder operable within the feeder duct to accumulate a charge of crop material therein and then stuff that accumulated charge into the bale chamber, the feeder comprising:
a tine bar holding member having rotatable rotatably mounted thereon at least one tine bar having mounted thereon a set of tines, the tine bar being rotatable about its own axis relative to the tine bar holding member and being rotatable together with the tine holding member about an offset axis;
a sun gear co-axial with and rotatable about the offset axis relative to the tine bar holding member;
a mechanical coupling drivingly coupling the tine bar to the sun gear, such that as the tine bar is rotated about the offset axis and the sun gear co-axially therewith is held stationary, wherein the mechanical coupling drivingly coupling the tine bar to the sun gear causes the tine bar to rotate about its own axis relative to the tine bar holding member, and the outer ends of the set of tines to follow a path of movement; and
an adjustment system configured for active adjustment of an angular position of the sun gear about the offset axis as the tine bar is rotated about the offset axis, the method comprising:
rotating the tine bar holding member about the offset axis; and
actively adjusting the angular position of the sun gear relative to the offset axis as the tine bar holding member is rotated about the offset axis.

23. The method according to claim 22, wherein:
the bale chamber further has a lower wall in which the inlet opening is formed, wherein the feeder duct has an upper end facing generally upwardly and communicating with the inlet opening in the bale chamber and a lower end facing generally in a forward direction;
the feeder duct is generally circularly curved in shape with a center of curvature being either co-incident with the offset axis or proximate thereto, and, during operation, the set of tines of the tine bar move through the feeder duct in a direction from the lower end toward the upper end thereof; and
in a part of an angular motion of the tine bar between the upper end and the lower end of the feeder duct the sun gear is angularly moved such that the tine bar is angularly moved about its own axis relative to the tine bar holding member in a direction opposite to a direction of rotation of the tine bar about the offset axis, and in the part of the angular motion of the tine bar between the lower end and the upper end of the feeder duct the sun gear is angularly moved such that the tine bar is not angularly moved about its own axis relative to the tine bar holding member or is angularly moved about its own axis relative to the tine bar holding member with an angular displacement that is small relative to an angular displacement of the tine bar about its own axis relative to the tine bar holding member in the part of the angular motion of the tine bar between the upper end and the lower end of the feeder duct.

24. The method according to claim 22, wherein the mechanical coupling is adapted to cause the tine bar to rotate about its own axis relative to the tine bar holding member in a direction opposite to a direction of rotation of the tine bar about the offset axis as the tine bar is rotated about the offset axis and the sun gear is held stationary;
wherein the bale chamber further has a bottom wall in which the inlet opening is formed, wherein the feeder duct has an upper end facing generally upwardly and communicating with the inlet opening in the bale chamber and a lower end facing generally in a forward direction;
wherein the feeder duct is generally circularly curved in shape with the center of curvature being either co-incident with the offset axis or proximate thereto, and, during operation, the set of tines of the tine bar move through the feeder duct in a direction from the lower end toward the upper end thereof; and
wherein over at least part of the angular motion of the tine bar relative to the offset axis between the lower end and the upper end of the feeder duct the sun gear is angularly displaced in a same direction as the direction of rotation of the tine bar about the offset axis and over at least part of the angular motion of the tine bar between the upper end and the lower end of the feeder duct the sun gear is rotated in the direction opposite to the direction of rotation of the tine bar about the offset axis.

25. The method according to claim 22, wherein for each full cycle of reciprocating motion of the plunger the tine bar is rotated about the offset axis in a plurality of full cycles; and
wherein during one of the cycles of the rotation of the tine bar about the offset axis the sun gear is angularly moved such that an angular movement of the tine bar about its own axis relative to the tine bar holding member is amplified relative to an angular movement of the tine bar about its own axis relative to the tine bar holding member during other cycles of the rotation of the tine bar about the offset axis.

* * * * *